United States Patent
Whittlesey et al.

(10) Patent No.: US 7,306,511 B2
(45) Date of Patent: Dec. 11, 2007

(54) SYSTEMS WITH INTERCHANGEABLE HORNS FOR PRODUCING ENCASED PRODUCTS AND RELATED METHODS, COMPUTER PROGRAM PRODUCTS AND HORN ROTOR ASSEMBLIES

(75) Inventors: Thomas E. Whittlesey, Apex, NC (US); Edward P. Brinson, Cary, NC (US); Kim L. Poling, Fuquay-Varina, NC (US)

(73) Assignee: Tipper Tie, Inc., Apex, NC (US)

( * ) Notice: Subject to any disclaimer, the term of this patent is extended or adjusted under 35 U.S.C. 154(b) by 534 days.

(21) Appl. No.: 10/729,282

(22) Filed: Dec. 5, 2003

(65) Prior Publication Data

US 2005/0053699 A1   Mar. 10, 2005

Related U.S. Application Data

(60) Provisional application No. 60/501,647, filed on Sep. 9, 2003.

(51) Int. Cl.
*A22C 11/02* (2006.01)
(52) U.S. Cl. ....................................... 452/45
(58) Field of Classification Search ............ 452/21–26, 452/30–35, 36, 37, 46, 47, 51
See application file for complete search history.

(56) References Cited

U.S. PATENT DOCUMENTS

| | | | |
|---|---|---|---|
| 3,543,378 A | | 12/1970 | Klenz |
| 3,964,236 A | * | 6/1976 | Smith ........................ 452/34 |
| 4,142,273 A | * | 3/1979 | Gay ........................... 452/46 |
| 4,417,368 A | * | 11/1983 | Washburn ................. 452/34 |
| 4,417,434 A | * | 11/1983 | Piereder .................... 452/37 |
| 4,675,945 A | | 6/1987 | Evans et al. ............... 452/48 |
| 4,847,953 A | | 7/1989 | Evans et al. ............... 452/36 |
| 4,914,784 A | * | 4/1990 | Nausedas ................... 452/34 |
| 4,991,260 A | * | 2/1991 | Nausedas ................... 452/35 |
| 5,042,234 A | | 8/1991 | Evans et al. ............... 53/523 |
| 5,067,313 A | | 11/1991 | Evans ....................... 53/576 |

(Continued)

OTHER PUBLICATIONS

Product Brochure, "The RS4202M Can Do It All," © 1998, www.tippertie.com, 2 sheets, product available prior to the filing of the application.
Product Brochure, "Production Made Easy With the Tipper Tie RS4202M Glue Seal System," www.tippertie.com, 1 sheet, product available prior to the filing of the application.
International Search Report and the Written Opinion, dated Jan. 8, 2007 for corresponding PCT application No. PCT/US2004/029203 (11 pages).

*Primary Examiner*—Thomas Price
(74) *Attorney, Agent, or Firm*—Myers Bigel Sibley & Sajovec PA

(57) ABSTRACT

Methods for producing encased products using selectable first and second horns to thereby produce products in selectable different casing types include: (a) providing an apparatus having a first horn that, in operation, is configured to be in fluid communication with a filler pump located upstream thereof, (b) removing the first horn from the apparatus; and (c) mounting a second horn assembly comprising an intermediate pipe segment in fluid communication with a casing horn to the apparatus. The casing horn can pivot side-to-side. Related apparatus, systems, kits, assemblies and computer program products are configured to allow dual operational modes of producing encased products using first or second horns.

24 Claims, 22 Drawing Sheets

U.S. PATENT DOCUMENTS

| | | | |
|---|---|---|---|
| 5,071,326 A * | 12/1991 | Wright et al. | 417/517 |
| 5,074,386 A | 12/1991 | Evans | 188/67 |
| 5,085,036 A | 2/1992 | Evans et al. | 53/550 |
| 5,167,567 A | 12/1992 | Evans | 452/37 |
| 5,181,302 A | 1/1993 | Evans | 29/243.56 |
| 5,203,760 A | 4/1993 | Chen et al. | 493/302 |
| 6,283,846 B1 * | 9/2001 | Townsend | 452/27 |
| 6,401,885 B1 | 6/2002 | Whittlesey | 188/322.16 |
| RE37,883 E * | 10/2002 | Townsend | 452/47 |
| 6,616,521 B1 * | 9/2003 | Townsend | 452/32 |

* cited by examiner

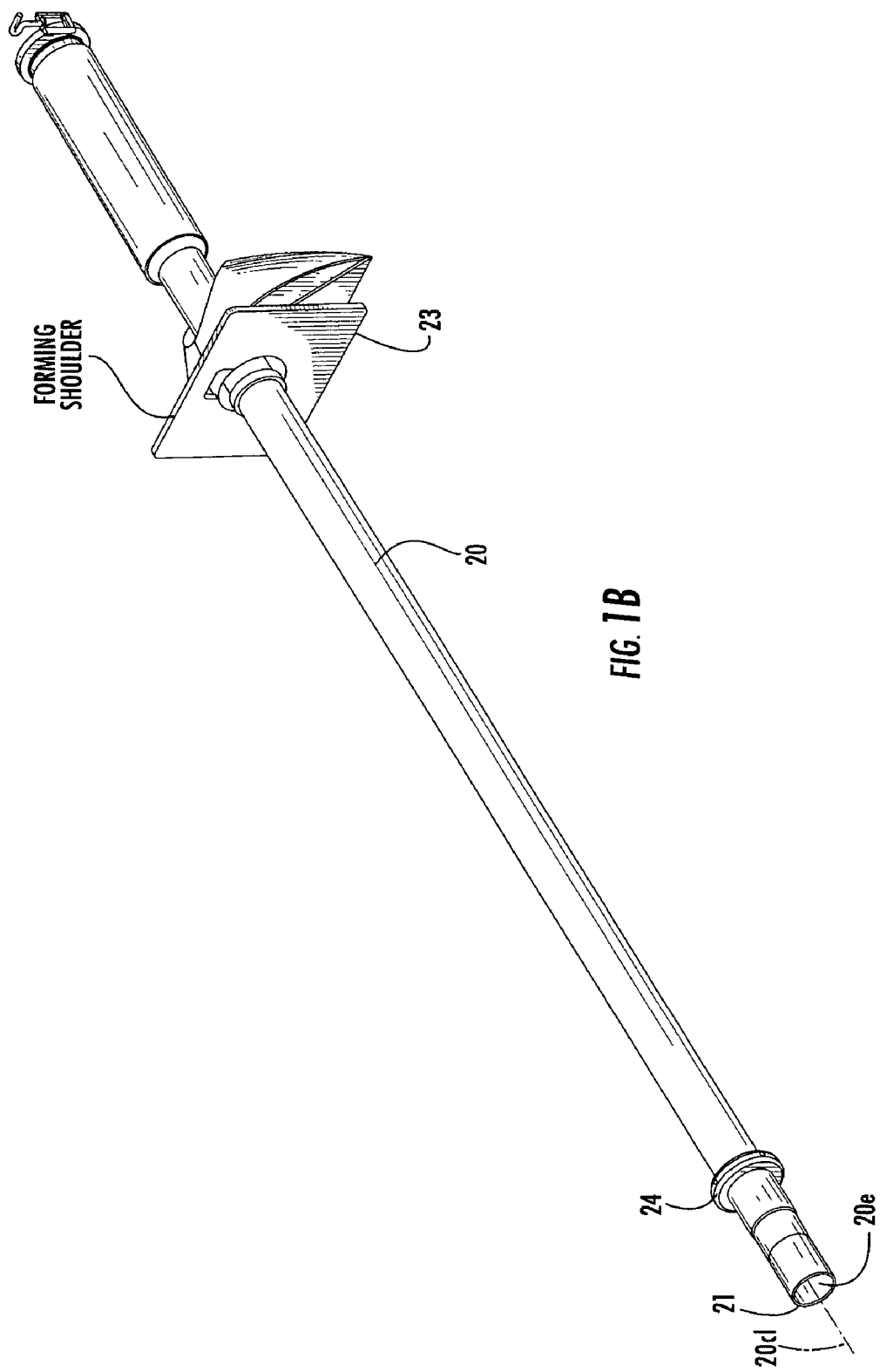

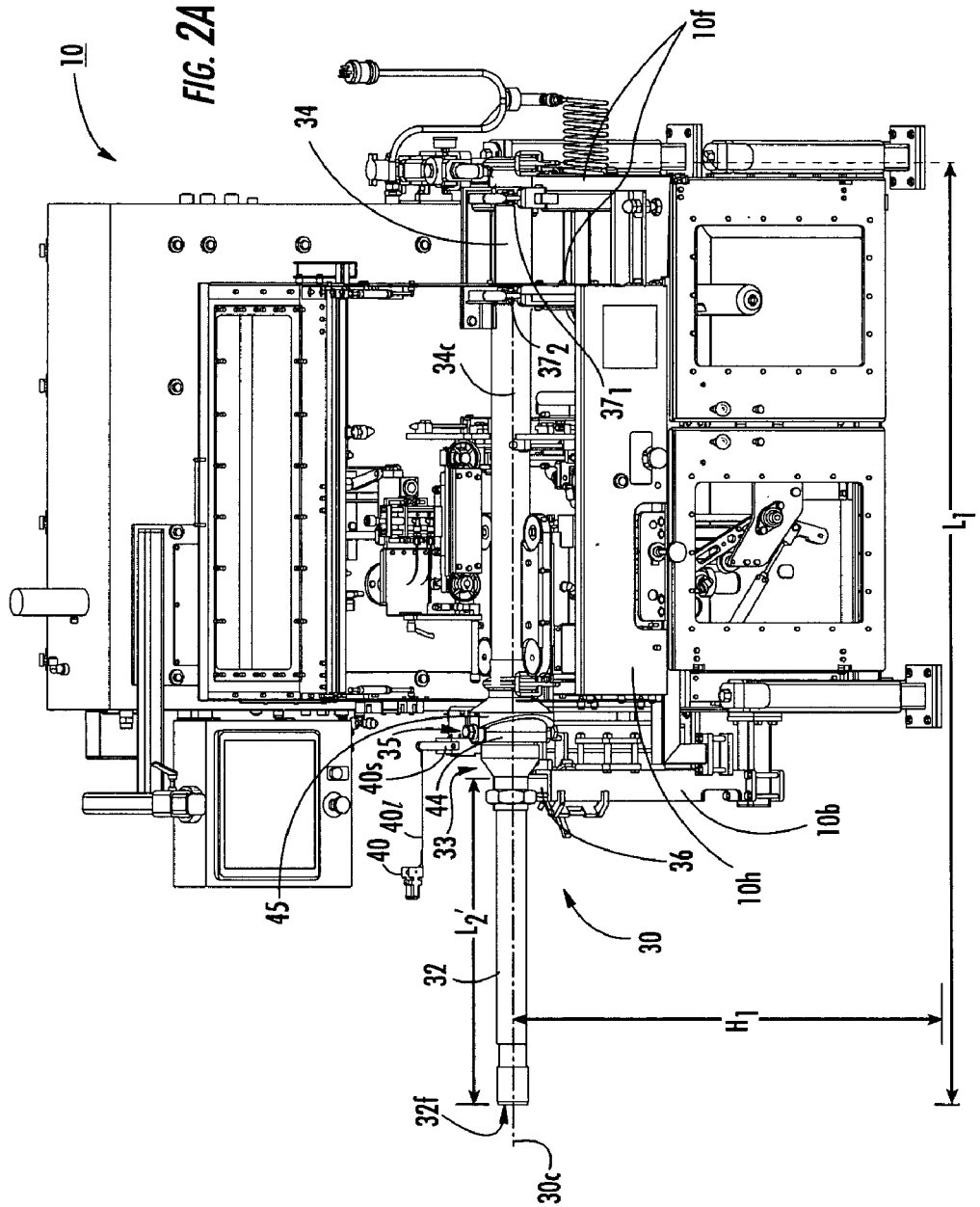

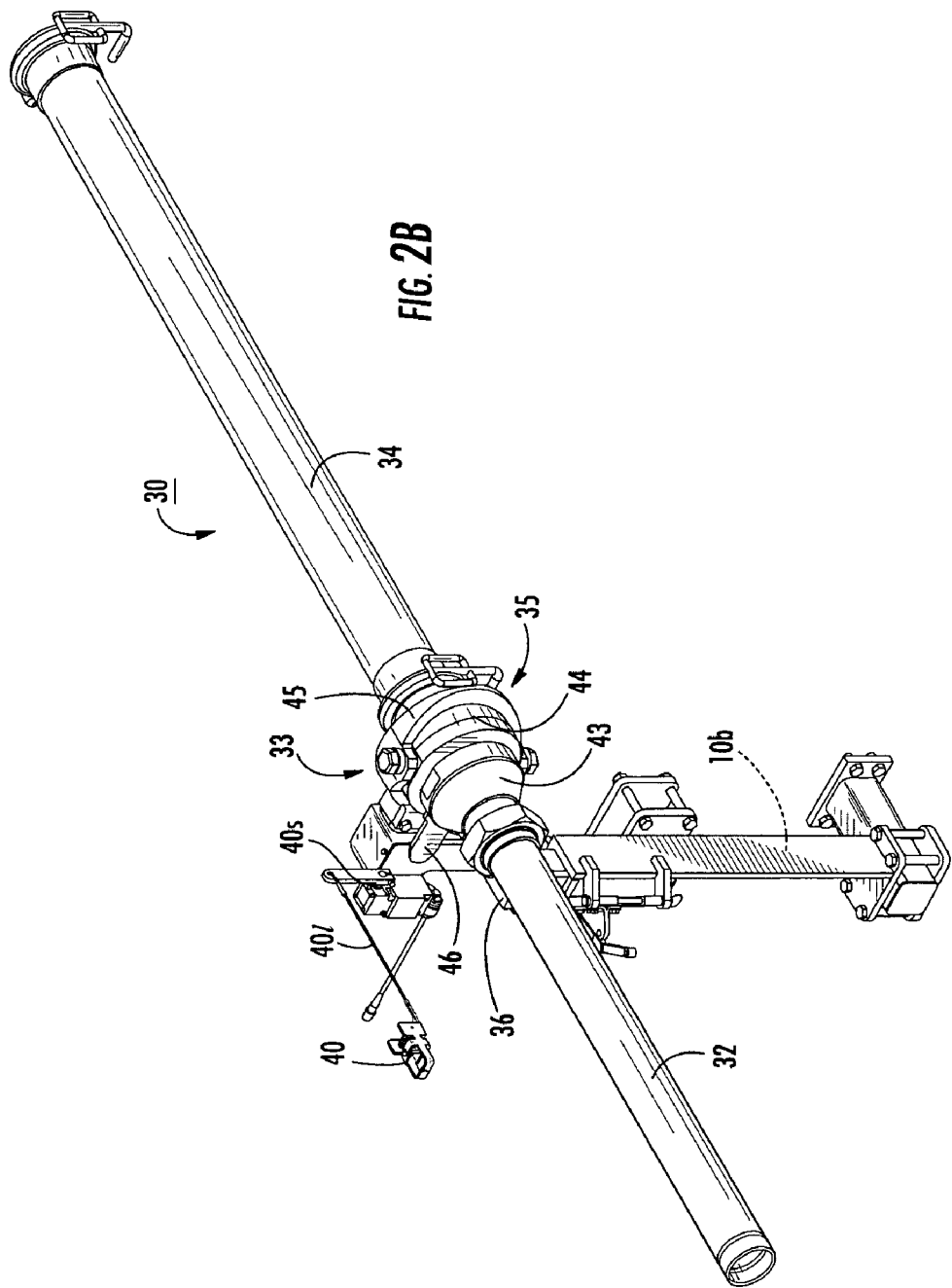

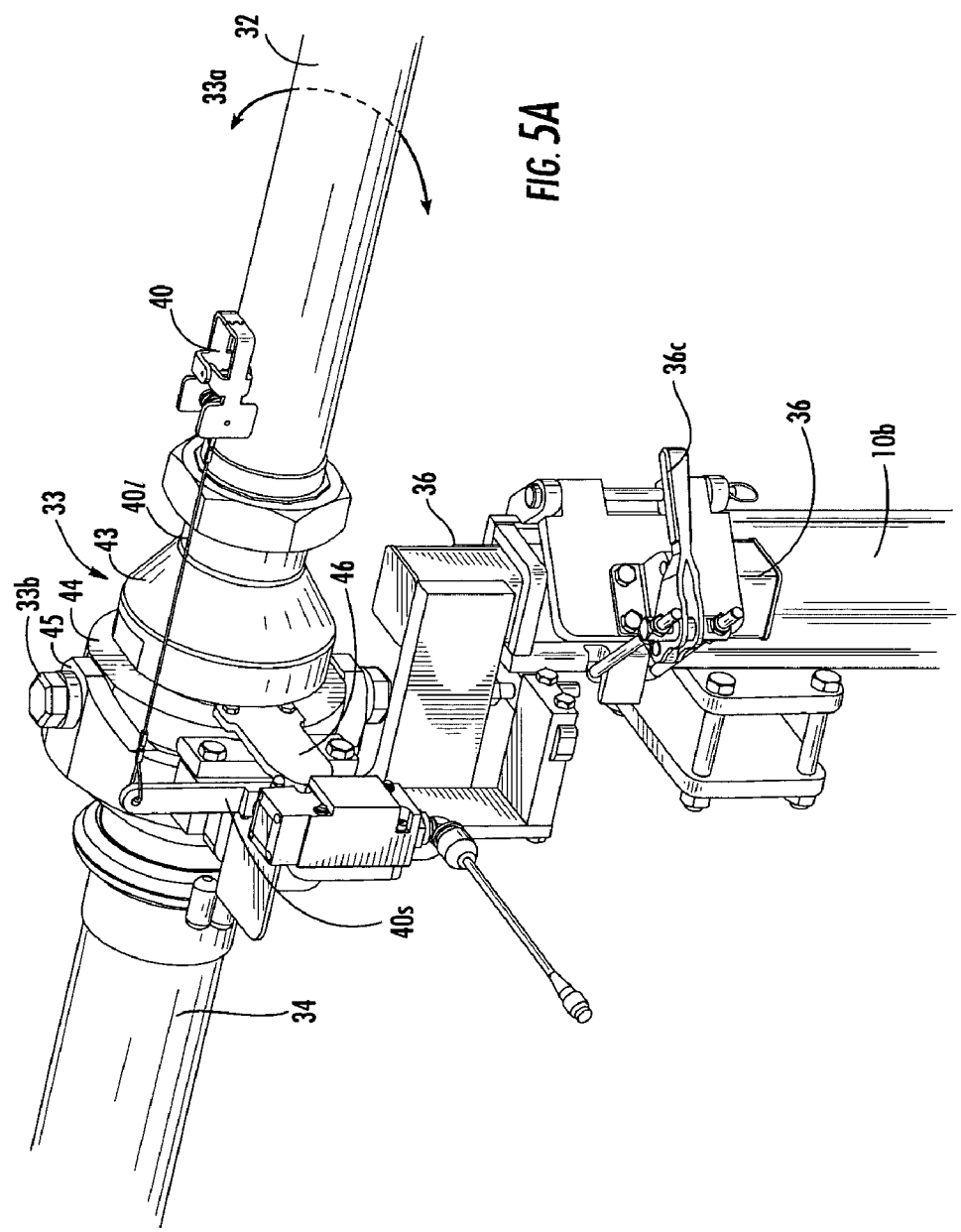

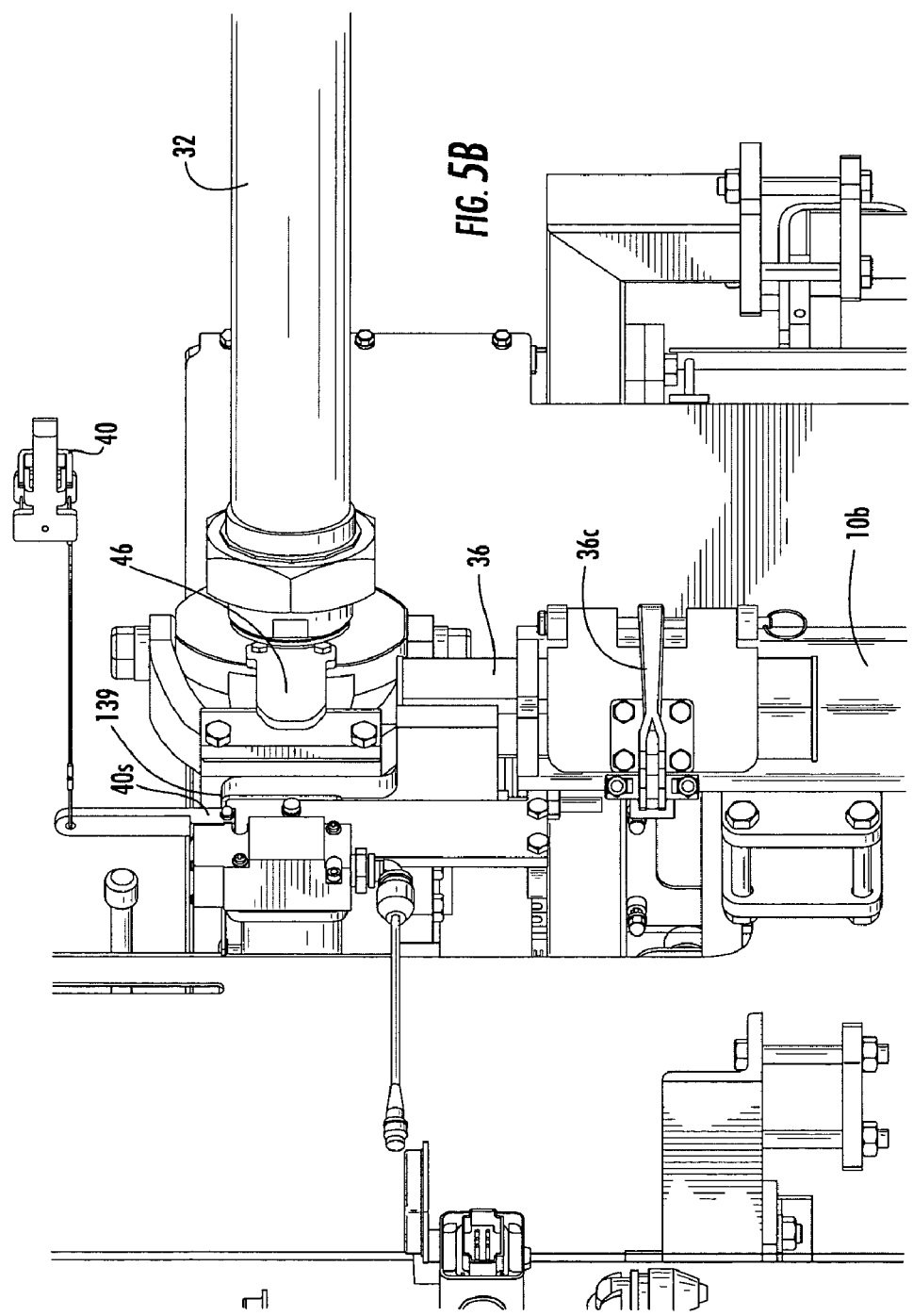

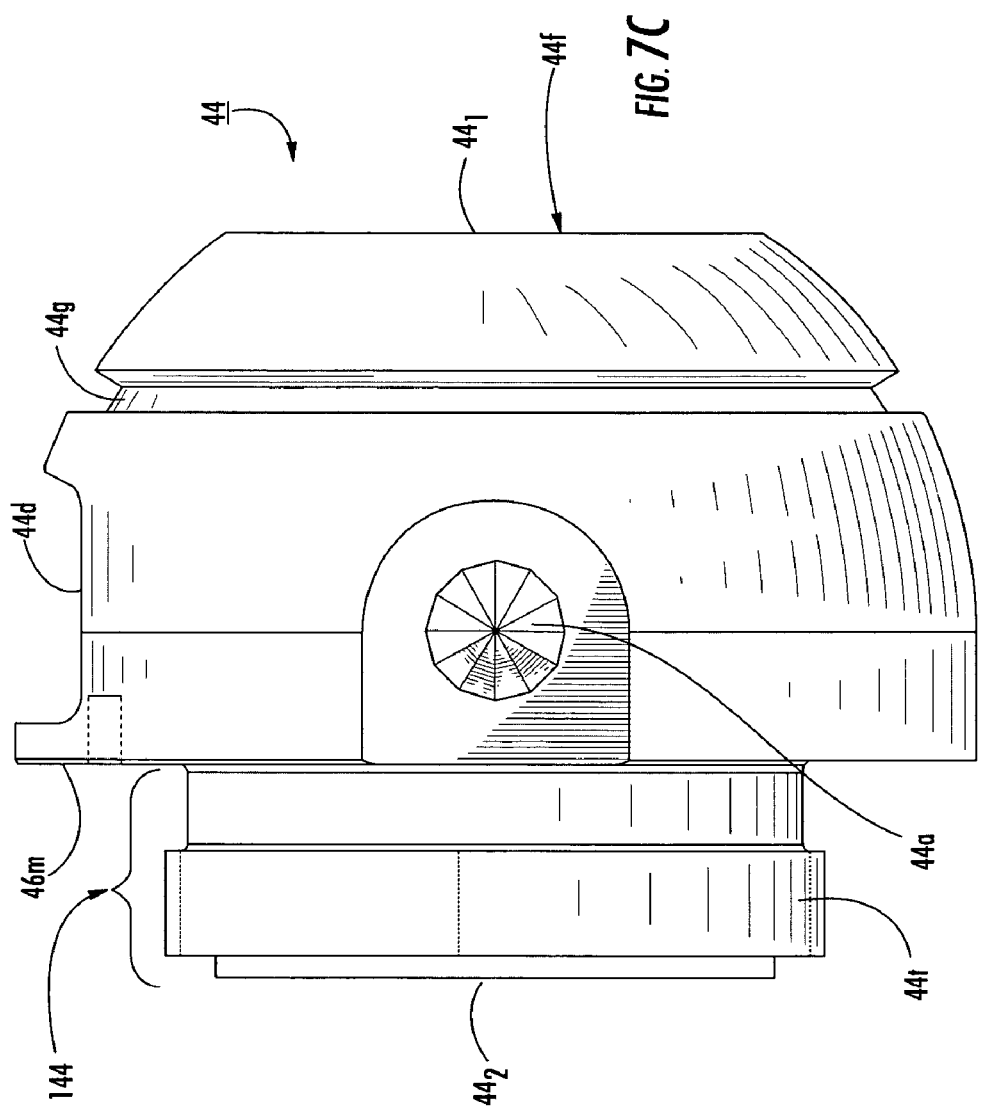

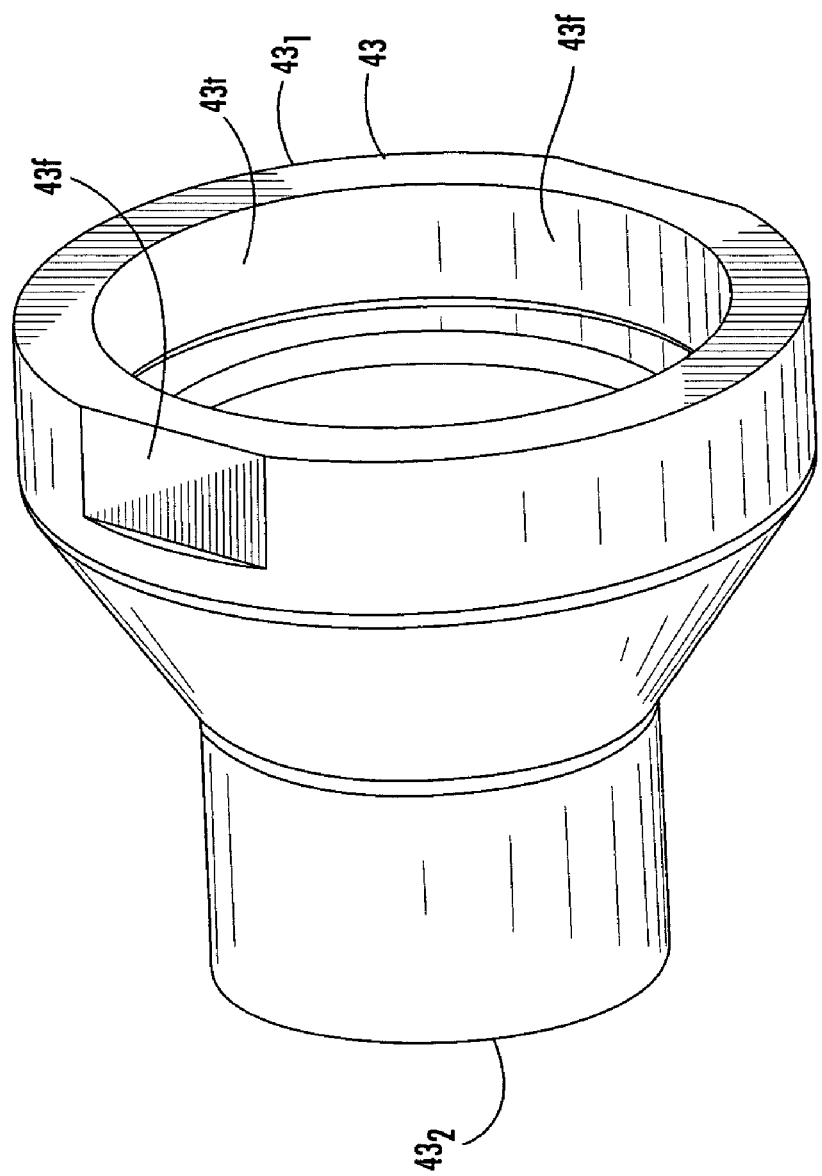

SYSTEMS WITH INTERCHANGEABLE HORNS FOR PRODUCING ENCASED PRODUCTS AND RELATED METHODS, COMPUTER PROGRAM PRODUCTS AND HORN ROTOR ASSEMBLIES

RELATED APPLICATION

This application claims priority to U.S. Provisional Application Ser. No. 60/501,647, filed Sep. 9, 2003, the contents of which are hereby incorporated by reference as if recited in full herein.

FIELD OF THE INVENTION

The present invention relates to apparatus, systems, methods and computer program products that stuff or fill product into casings that enclose products therein.

BACKGROUND OF THE INVENTION

Conventionally, in the production of consumer goods such as, for example, meat or other food products, the food is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming a thin sheet of flexible material, typically elastomeric material, together. U.S. Pat. Nos. 5,085,036 and 5,203,760 describe examples of automated substantially continuous-feed devices suitable for forming sheet material or flat roll stock into tubular film casings. The contents of these patents are hereby incorporated by reference as if recited in full herein.

Despite the foregoing, certain factories and plants desire the capability and/or flexibility to be able to produce products using either type of casing without requiring dedicated equipment space and/or separate production lines dedicated to each type of casing.

SUMMARY OF EMBODIMENTS OF THE INVENTION

Embodiments of the present invention provide apparatus, systems, devices, kits, methods and computer program products configured to allow two types of casings to be output (such as, for example, seamed and unseamed casings) that use corresponding different horns that are filled in a manner that reduces the amount of dedicated equipment and/or equipment space needed to accommodate both types of horns individually, and/or that integrate two production lines into a single production line with interchangeable horn components. The interchangeable horn components can be configured to releasably connect to and/or disconnect from a substantially common support structure and allow the changeover to different horns and different casing types in a manner that minimally disrupts the production line equipment upstream and/or downstream thereof.

In certain embodiments, a first horn and second horn assembly are aligned along a common axial centerline and sized and configured to occupy substantially the same floor space. The first horn can be configured to operate with in situ fabricated heat-sealed and seamed elastomeric casings and the second horn can be configured to operate with pre-made casing slugs. The housing of the heat-sealing equipment can remain in location and hold certain components of the second horn assembly when the second horn is in use. The horns and apparatus housing can be configured for a relatively quick changeover of casing/horn type (typically on the order of less than about 15 minutes).

Embodiments of the invention are directed to methods for producing encased products using selectable first and second horns to thereby produce products in selectable different casing types. The methods include: (a) providing an apparatus having a first horn that, in operation, is configured to be in fluid communication with a filler pump located upstream thereof; (b) removing the first horn from the apparatus; and (c) mounting a second horn assembly comprising an intermediate pipe segment in fluid communication with a casing horn to the apparatus. The first horn is configured and sized to flow product therethrough and to cooperate with the apparatus to form and/or guide seamed casing material thereabout. In operation, the second horn assembly is configured to be in fluid communication with the filler pump for flowing product therethrough and the casing horn is configured to hold non-seamed casing material thereon.

In particular embodiments, the casing horn can have opposing first and second ends with the second end terminating into a horn rotor assembly. The mounting the second horn assembly to the apparatus can include: (a) attaching the horn rotor assembly to the apparatus; (b) mounting the casing horn to the horn rotor assembly; and (c) pivoting the casing horn generally horizontally (so that the discharge end is closer to an operator or user). In addition, the horn rotor assembly can include a support leg attached thereto and the apparatus can include a leg support bracket fixed thereto. The attaching step can be carried out by sliding the support leg into the leg support bracket.

Other embodiments are directed to apparatus with interchangeable horns for engaging with a filler/product pump and supplying elongate casings for encasing products therein. The apparatus includes: (a) a housing having a support structure and opposing upstream and downstream end portions; (b) a first horn releaseably mountable to the housing support structure, the first horn having a length, an outer surface and an internal flow channel therein; and (c) a horn rotor assembly releasably mountable to the housing support structure, the horn rotor assembly comprising a pivotable casing horn with an outer surface and an intermediate pipe segment, each having a respective internal flow channel therein. In operation, the first horn is configured to direct casing material to travel over the outer surface while product travels through the internal flow channel when the first horn is in position. Alternatively, in operation, with the second horn in position, product travels through the intermediate flow channel into the pivotable casing horn while the casing horn directs a supply of casing material to travel over the outer surface thereof.

The first horn may be a heat seal horn configured to cooperate with sheet roll stock to form seamed elastomeric tubular casing in situ and the casing horn can be configured to hold and release slugs of shirred fibrous casing material. The apparatus can include means for forming and sealing planar elastomeric (i.e., polymeric) sheet stock disposed in the housing.

In certain embodiments, the horn rotor assembly has an overall assembled length that includes the lengths of the casing horn, pivot head and intermediate pipe segment with the overall length being substantially the same as the first horn length.

Still other embodiments are directed to horn rotor assemblies. The horn rotor assemblies include: (a) a pivot head having a flow passage extending therethrough; and (b) an elongate casing horn having opposing first and second end portions, an outer surface and an internal flow channel. The second end portion is attached to the pivot head so that casing horn is pivotable.

In particular embodiments, the casing horn and pivot head are configured to allow the casing horn to pivot from side-to-side and/or laterally outward while held in a substantially horizontal or level configuration with the casing horn flow channel and pivot head flow passage in fluid communication. The horn rotor assembly can also include a support member attached to the pivot head. In addition, the horn rotor assembly can include a protrusion member mounted to the pivot head and configured to align with a proximity sensor when in operative position to thereby identify that the casing horn and/or pivot head are in proper operative position.

In particular embodiments, the pivot head comprises a coupling member that can have a semi-spherical profile that is held in a socket member and the socket member can be configured to snugly receive the coupling member while allowing the coupling member to pivot relative thereto.

Other embodiments are directed to kits for modifying an apparatus that produces tubular casings from roll-stock to output non-seamed casings. The kits can be supplied as a retrofit or upgrade option and the like. The kits include: (a) a casing horn and an intermediate pipe segment; and (b) a bracket configured to mount to the apparatus and hold the casing horn and/or intermediate pipe segment with respect thereto.

In certain embodiments, the casing horn in the kit is attached to a pivot head and is configured to pivot (typically from an installation or outwardly extending axially offset configuration to an operative axially aligned position). The kit may optionally include a tension clip attachable to the casing horn and configured to hold an end portion of a slug of fibrous casing material for cooperating with a limit switch to automatically identify when a length of fibrous casing material is expended.

Still other embodiments are directed to computer program products for operating an apparatus that releaseably mounts a plurality of different selectable horns to supply different casing material and fill the selected casing material to provide an encased elongate product. The computer program product includes a computer readable storage medium having computer readable program code embodied in the medium. The computer-readable program code includes: computer readable program code configured to provide a plurality of different predetermined operational modes of an apparatus that releaseably mounts first and second horns with different horn configurations to supply different casings and a flowable product; and computer readable program code that selects one of the different operational modes responsive to whether a first horn with a first casing material or a second casing horn with a second casing material different from the first casing material is in communication with the apparatus.

In certain embodiments, the computer product can include computer readable program code that accepts user input to identify the type of casing material selected for deployment and/or a selection of operation with either the first or second horn. In addition, the computer program product may include computer readable program code configured to inhibit operation until the selected horn is in proper operative position.

Still other embodiments are directed to systems for producing encased products using selectable first and second horns to thereby produce products in selectable different casing types. The systems include: (a) an apparatus having a releaseably mountable first horn that, in operation, is configured to be in fluid communication with a filler pump located upstream thereof, the first horn configured and sized to flow product therethrough and to cooperate with the apparatus to form and/or guide seamed casing material thereabout; and (b) means for mounting a second horn assembly comprising an intermediate pipe segment in fluid communication with a casing horn to the apparatus. In operation, the second horn assembly is configured to be in fluid communication with the filler pump for flowing product therethrough and the casing horn is configured to hold non-seamed casing material thereon.

These and other objects and/or aspects of the present invention are explained in detail in the specification set forth below.

BRIEF DESCRIPTION OF THE DRAWINGS

FIG. 1B is a side perspective view of a releasably attachable elastomeric casing horn shown in FIG. 1A according to embodiments of the present invention.

FIG. 2A is a front view of the apparatus of FIG. 1A, but shown holding a different horn from that shown in FIG. 1A (shown holding a horn rotor assembly), according to embodiments of the present invention.

FIG. 2B is a side perspective view of a horn rotor assembly that is shown held in the apparatus shown in FIG. 2A according to embodiments of the present invention.

FIG. 5A is an enlarged partial side perspective view of the horn rotor assembly shown in FIG. 2B with a support leg held in a bracket according to embodiments of the present invention.

FIG. 5B is an enlarged partial side perspective view of the horn rotor assembly shown in FIG. 2B mounted to the apparatus of FIG. 2A according to embodiments of the present invention.

FIG. 7C is a side view of an alternative embodiment of a coupler that may be used to connect the casing horn to the apparatus shown in FIG. 2A.

FIG. 7D is a side perspective view of an adapter suitable for use with the coupler of FIG. 7C and the casing horn as shown in FIG. 2A.

DETAILED DESCRIPTION

Figure 1A:
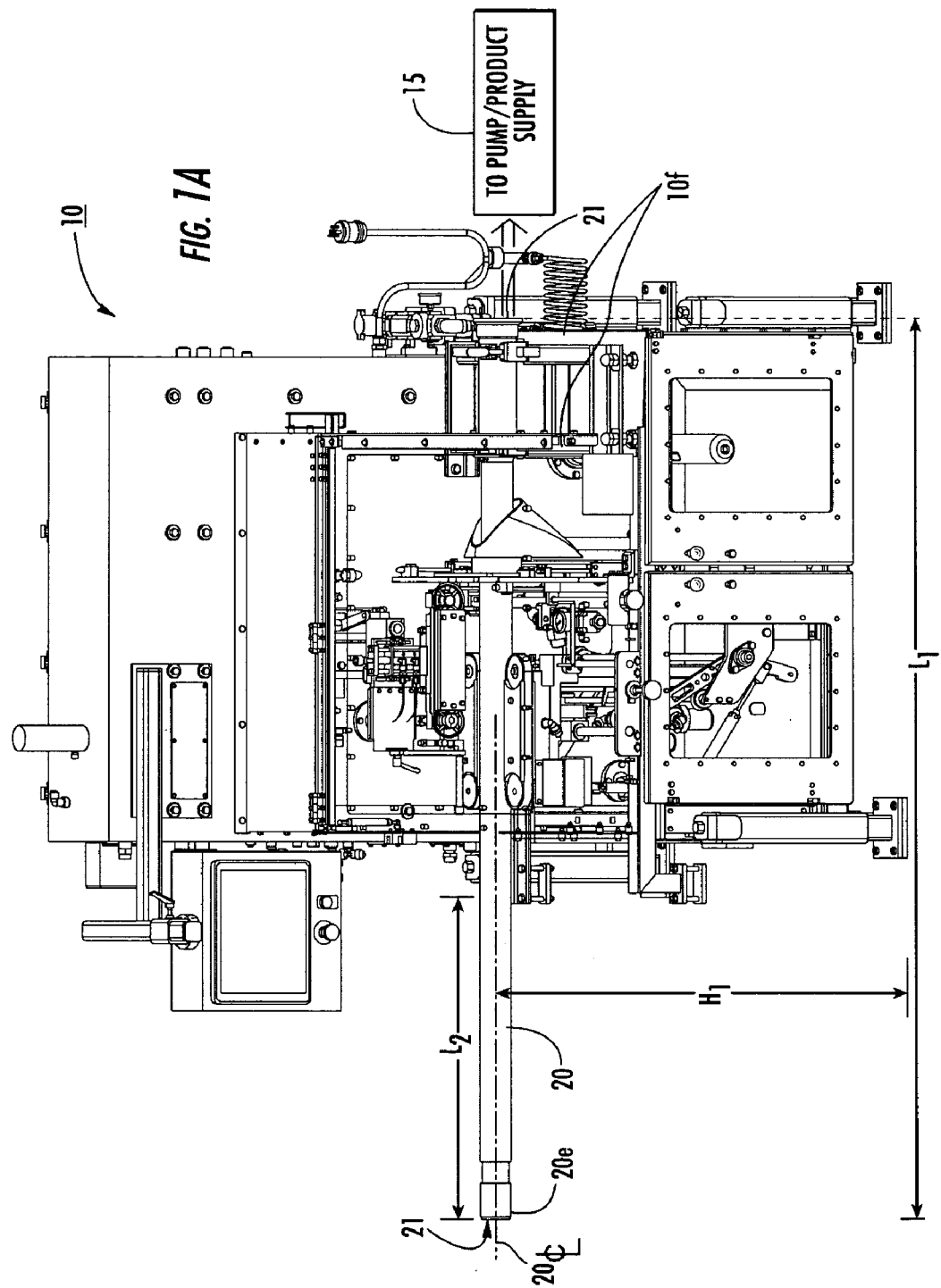
FIG. 1A is a front view of a sealing apparatus configured to hold and/or engage interchangeable horns (shown with an elastomeric casing horn) according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The present invention is particularly suitable for producing encased products that may also employ closure clips to seal products held in the casings. The product may be a linked chain of elongated extruded product held in a casing. The casing can be any suitable casing (edible or inedible, natural or synthetic) such as, but not limited to, collagen, cellulose, plastic, elastomeric and/or polymeric casing. Typically, a first horn is configured to form seamed tubular casings from an elastomeric and/or polymeric sheet and/or planar roll stock that is then stuffed or filled with flowable product. A second horn can supply a natural and/or edible (typically fibrous) casing onto the product. More typically, the elastomeric and/or polymeric sheet is a relatively thin sheet (or film) of roll-stock that can be formed in situ into a continuous length of heat-sealed and/or otherwise joined or seamed tubular casing. The forming can be carried out substantially automatically and continuously over a desired interval (typically between at least about 45-60 minutes, depending on the size of the length of the roll stock). The seaming can be performed using a heat seal as is conventional and/or ultrasonic, adhesive, light (ultraviolet or other desired wavelength), chemical, and/or other sealing means as is suitable. The seam can be a flat, fin, or other overlapping and/or abutting joint configuration.

The encased elongated or tubular product can be an elongated food product, typically a meat product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand and the like or other flowable materials including wet (similar to that held conventionally in cans) pet food or other powder, granular, solid, semi-solid or gelatinous materials. The product may be a packaged in any suitable industry including food, aquaculture, agriculture, environment, chemical, explosives, or other applications.

As will be discussed further below, the first and second horns can serially cooperate with a shirred voiding/clipping apparatus located downstream of the respective horn to produce an elongated product can be produced in a linked chain of tubular or chub product with clips applied at desired intervals. The length and diameter of each link or chub as well as the overall length of the chain can vary depending on the type of product being produced. Examples of typical strand or chain lengths are between about 1-6 feet. See, e.g., U.S. Pat. Nos. 3,543,378, 5,167,567, 5,067,313, and 5,181,302, the contents of which are hereby incorporated by reference as if recited in full herein.

Turning now to FIG. 1A, an exemplary apparatus or system 10 configured to form seamed tubular casings is shown. The apparatus 10 includes a first horn 20 which cooperates with forming and sealing mechanisms held therein to convert flat roll stock material into tubular seamed casing as the material travels in the apparatus 10 and over the horn 20. Examples of tubular casing forming apparatus and an associated heat-sealing horn are described in U.S. Pat. Nos. 5,085,036 and 5,203,760, the contents of which are hereby incorporated by reference. However, as stated above, the apparatus may be configured to produce the tubular casings using additional and/or alternative joining or seaming means.

As shown in FIG. 1A, the first horn 20 is in fluid communication with a filler/product pump and supply 15 located upstream thereof as shown schematically in this figure. The first horn 20 includes an internal flow channel 21 that extends through the horn 20. In operation, the flow channel 21 directs product to flow therethrough (sealed from the environment). As the product exits the discharge end 20e of the horn 20, it is stuffed into or fills the casing material that is held around the outer surface of the horn 20. In the embodiment shown, the horn 20 has an axially extending center line 20c, a height $H_1$ above the floor to the centerline 20c, an overall length $L_1$, and a length $L_2$ for the portion of the horn that extends beyond the downstream wall of the apparatus 10. The horn 20 can be positioned in the apparatus 10 on support structures 10f so that it is substantially horizontal with the centerline aligned with upstream and downstream components during operation.

FIG. 1B shows the first horn 20 separate from the apparatus 10. The first horn 20 typically includes a forming shoulder 23 on an upstream end portion that guides and/or shapes roll stock (not shown) to substantially conform to the shape of the tubular horn as the material travels away from the forming shoulder and hence wrap the elastomeric or other desired material around the horn 20. As shown, a guide and/or pre-sizing ring 24 can be held on the horn proximate the discharge end 20e to help provide the desired tension/size on the casing as it encases the product. Typically, the casing material travels over the outermost perimeter of the guide 24 as is known to those of skill in the art, as the casing material is drawn downstream.

FIG. 2A illustrates the apparatus 10 in communication with a second horn 32 and related components. As shown, the second horn configuration is a second horn assembly 30 including an intermediate pipe segment 34, a pivot head 33, and a casing horn 32. The second horn assembly 30 includes an internal flow channel therethrough 32f (i.e., a sealed channel extending through the respective intermediate pipe segment 34, pivot head 33, and casing horn 32). The pivot head 33 and casing horn 32 can form a horn rotor assembly 35. The pivot head 33 can include a coupler 44 and socket 45 that are held together (shown with bolts 33b) in a manner that allows the desired pivotal movement. Other joining configurations may be used to hold the coupler 44 and socket 45 together as will be known to those of skill in the art. The second horn assembly 30 is typically configured to run with different casing (non-seamed or slugs) materials. For example, the second horn 32 may be configured to serially receive and output lengths of shirred fibrous casings.

The intermediate pipe 34 can be held in the apparatus on suitable support structure 10f and may be clamped at one or more locations with clamps $37_1$, $37_2$. Although shown with two clamps other numbers of clamps (or none) may be used as appropriate to stabilize and/or hold the pipe in its operative position during operation. As shown, the intermediate pipe 34 can be configured and aligned to have a centerline 34c that is substantially same as the first horn 20 when it is held in the apparatus 10. Similarly, in operative position, the second (casing) horn 32 can also have the same centerline location as that of the first horn 20. As such, in certain embodiments, the height $H_1$ of each of the first and second horns 20, 32, respectively can be substantially the same when held in operative position. In addition, the overall length $L_T$ of the second horn assembly 30 may be substantially the same as the length $L_1$ of the first horn 20 (typically within about 5 inches, and more typically within about 2 inches). That is, the assembled length of the second horn assembly including the casing horn 32, the pivot head 33, and the intermediate pipe 34 can be substantially the same as the length $L_1$ of the first horn $L_1$. Configuring the second horn assembly 30 and the first horn 20 to have substantially the same length can reduce any equipment spacing adjustments required for upstream and/or downstream equipment to allow for a more modular interchange without unduly disrupting existing product lines and/or to use substantially the same floor layout and space to change over from tubular film casing to shirred slug casing over the reverse.

In particular embodiments, the intermediate pipe segment 34 can extend substantially the entire axial length of the housing 10h. An exemplary range of lengths include an intermediate pipe segment 34 of about 49-51 inches, an overall length $L_T$ of the first horn 20 may be about 94-97 inches, and the overall length LT of the second horn assembly 30 may be about 92-95 inches.

The apparatus 10 can include a processor that is configured with dual run modes to selectively run either type of casing material as desired as will be discussed further below.

FIG. 2A illustrates that, in certain embodiments, the apparatus 10 can include a bracket 10b or other mounting means disposed on a downstream side of the housing 10h. The bracket 10b can be installed as a retrofit/upgrade component or installed as part of the OEM original equipment on the apparatus 10. The bracket 10b and/or other mounting structure can be configured to hold a support member 36 on the horn rotor assembly 35 to support the second horn assembly 30 downstream of the intermediate pipe segment 34. In other embodiments, the casing horn 32 can mount directly to a downstream apparatus 100 as shown for example in FIG. 10 with mount 136 and any extension pipe(s) or spacers 39 as required for proper spacing between the apparatus 100 and apparatus 10.

FIG. 2A also illustrates a tension clip 40 typically attachable to the pivot head 33 and/or a trailing edge or end portion of a slug of fibrous casing material for cooperating with a lead 40L attached to a limit switch 40s to automatically identify when a length of fibrous casing material is expended. The tension clip 40 may mount to the pivot head 33 or other desired mounting structure on one end and clip to the casing material on the other.

Figure 4:
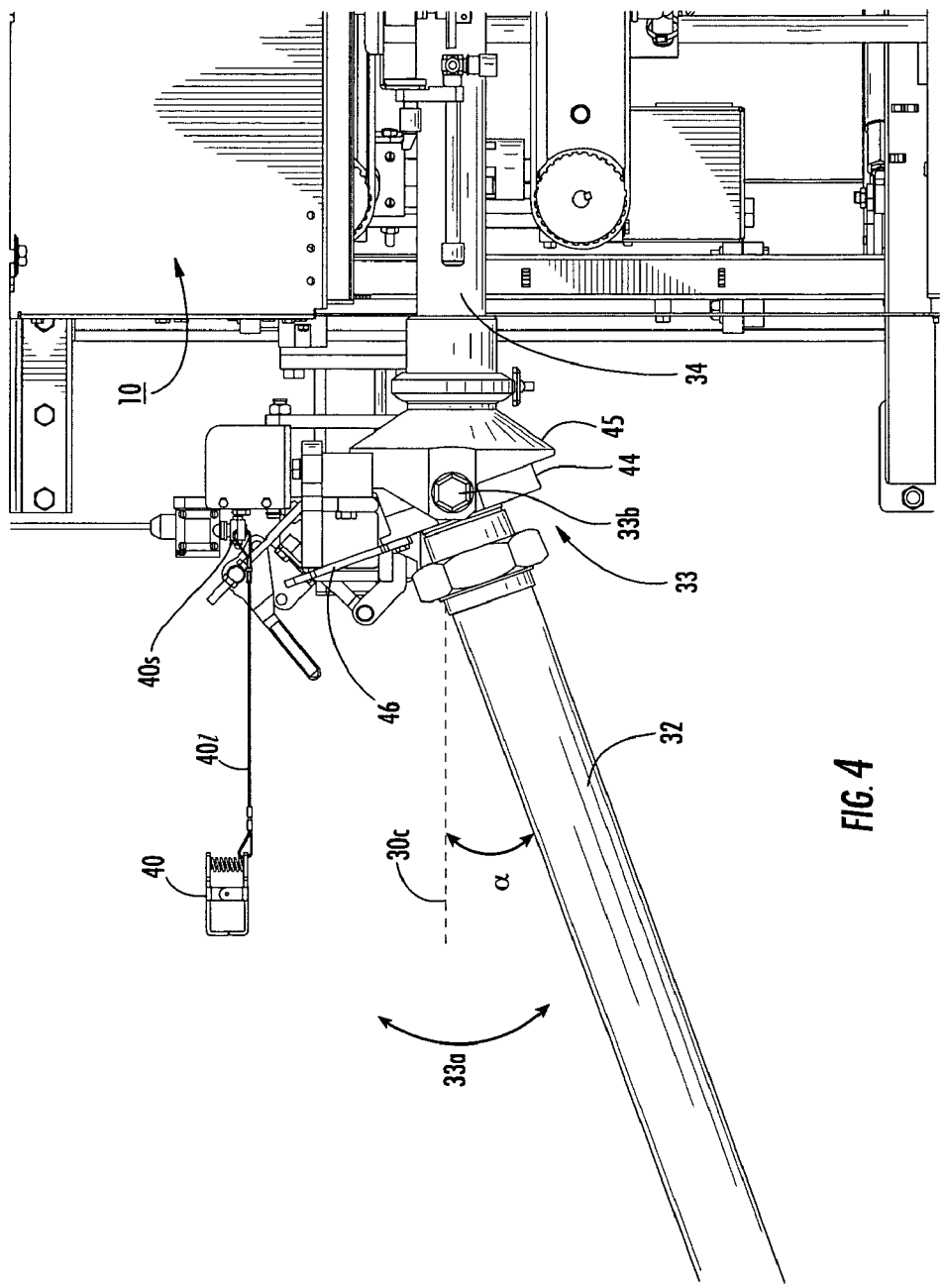
FIG. 4 is an enlarged top view of the horn rotor assembly shown in FIG. 2B shown in an exemplary casing load configuration where the casing head can pivot generally horizontally outwardly according to embodiments of the present invention.

FIG. 2B illustrates the second horn assembly 30 apart from the apparatus 10. As shown, the second horn assembly 30 may also include a manual lever that allows a technician or operator to manually trip the limit switch 40s as the casing material is expended or exhausted. FIG. 2B also illustrates that the horn rotor assembly 35 may also include a protrusion 46 (shown as a tongue or plate) that cooperates with a proximity switch that automatically confirms when the casing horn 32 and pivot head 33 are in proper operative position. As shown in FIG. 4, the casing horn 32 can be angled laterally away (side-to-side) from the axial position during loading of shirred casing material. The casing horn 32 may the pivot to a desired (axially aligned) operative configuration. Thus, upon alignment, the protrusion 46 cooperates with a proximity switch, which confirms the proper configuration and position of the casing horn 32 and pivot head 33. The proximity switch 146 (FIG. 5B) may be magnetic (and the protrusion formed of and/or coated with a magnetic material), optical, inductive or other suitable position detection system. Other electronic or electromechanical position detection systems may also be used.

Figure 2C:
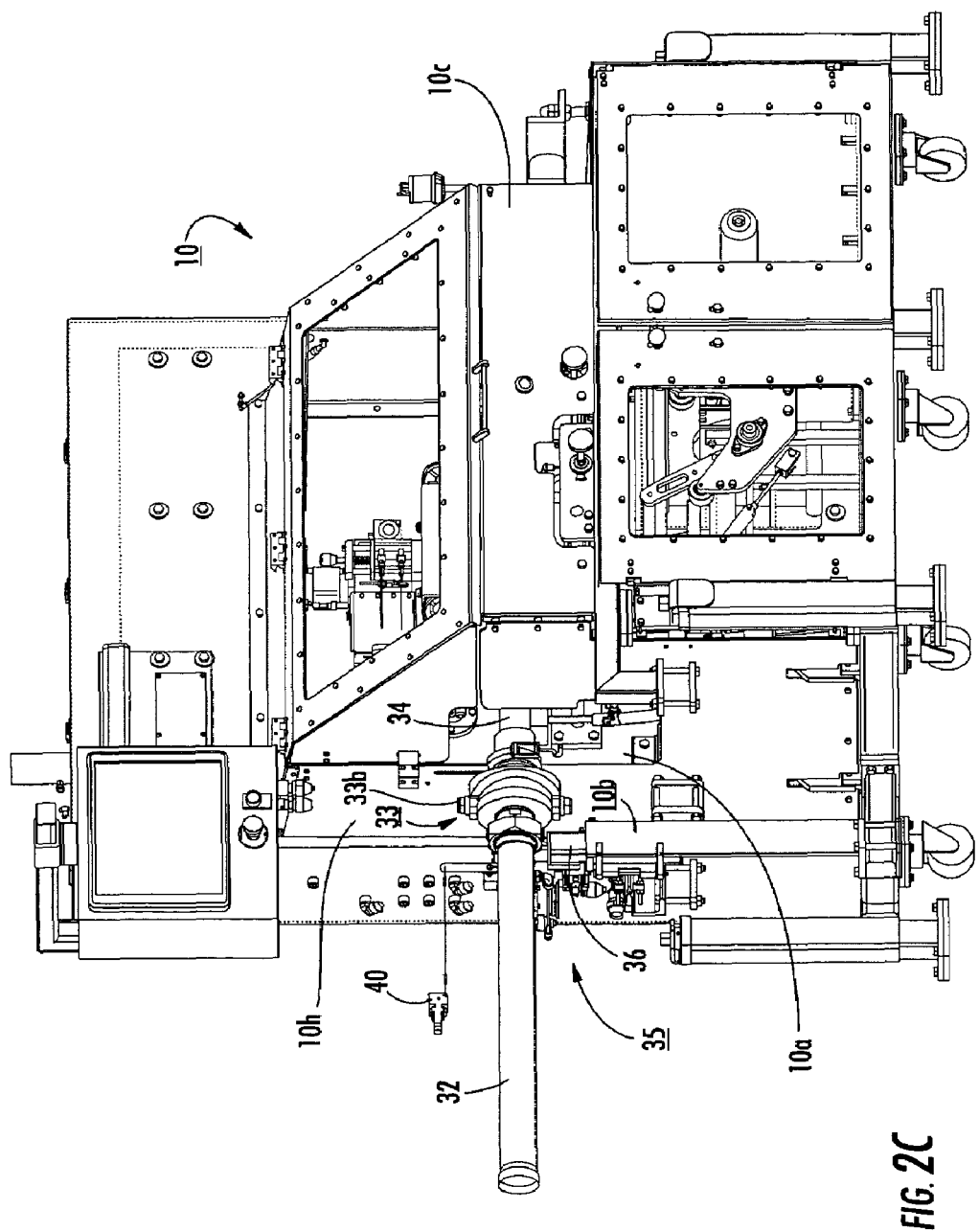
FIG. 2C is a front perspective view of a sealing apparatus of FIG. 2A shown with a housing cover in position according to embodiments of the present invention.

The pivot head 33 includes a coupler 44 and a socket 45 that receives and holds the coupler 44 and allows the casing horn 32 to pivot. In addition, the horn rotor assembly 35 illustrated in FIGS. 2A and 2B includes an (optional) adapter 43 with the pivot head 33. FIGS. 2C and 4 illustrate the second horn assembly 30 without the adapter 43. The adapter 43 may be used where a larger pivot head 33 is employed with a smaller casing horn 32 as will be discussed further below.

FIG. 2C illustrates the housing 10h with a cover in position and the intermediate pipe segment 34 extending out of a window 10a to attach to the horn rotor assembly 35 and/or pivot head 33.

Figure 3:
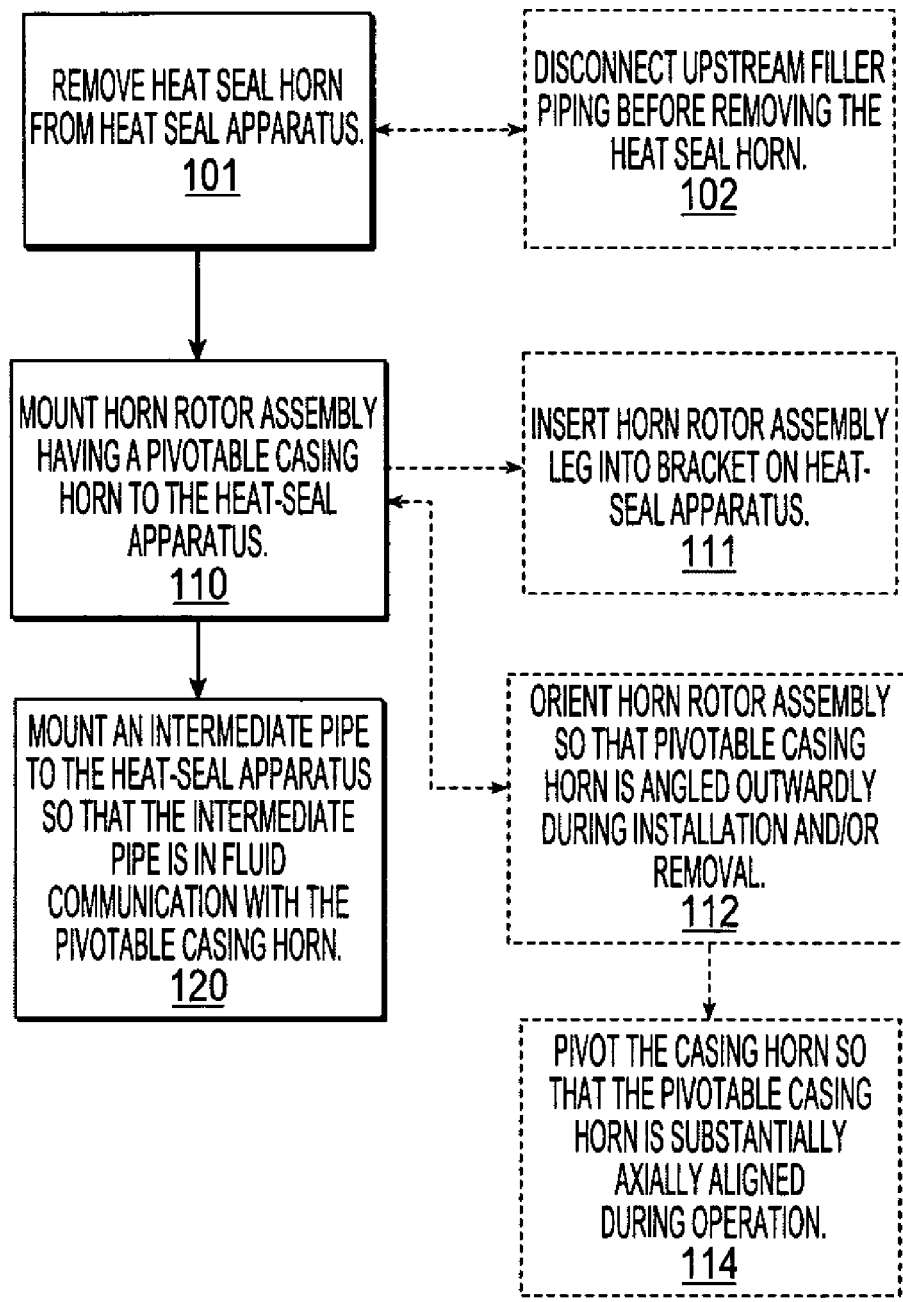
FIG. 3 is a flow chart of operations that can be carried out according to embodiments of the present invention.

FIG. 3 illustrates operations that may be carried out according to embodiments of the present invention. As shown, when changing over a heat-seal apparatus from a heat-seal horn to the casing horn, the heat seal horn is removed from the apparatus (block 101). The upstream or incoming (product or filler) pipe may be disconnected before the heat seal horn is removed (i.e., loosening or removing the clamp connecting the two) (block 102). The horn rotor assembly having a pivotable casing horn can be mounted to the heat-seal apparatus. The intermediate pipe segment can be mounted to the heat-seal apparatus so that the intermediate pipe segment is in fluid communication with the pivotable casing horn (block 120).

The horn rotor assembly can be mounted by inserting a horn rotor support leg into a bracket on the heat seal apparatus (block 111). The casing horn can pivot to angle laterally in a generally horizontal plane (i.e., side to side), away from the axial centerline during at least one of installation, reloading of (shirred) casing material, and/or removal (block 112). The casing horn can be in fluid communication with and/or connect to the intermediate pipe segment and the casing horn can pivot into a substantially horizontal axially aligned configuration during operation and (block 114).

In particular embodiments, referring first to FIGS. 1A and 2C, the cover 10c on the housing 10h is lifted, a horn clamp 22 removed and the first horn 20 lifted up and out of the apparatus 10 (the first horn may weigh about 50 lbs or even more). The horn rotor assembly 35 with the pivot head 33 and the horn rotor support member 36 can be positioned in the bracket and secured using a cam style locking clamp 36c (FIG. 5A) such as those available from Carr Lane Manufacturing Co., St. Louis, Mo. The casing horn 32 can then be attached to the pivot head 33 using an ACME sanitary thread nut for sealing to inhibit product leakage during operation. In other embodiments, the casing horn 32 may be attached to the pivot head 33 prior to mounting the horn assembly/pivot head to the apparatus 10. As shown in FIG. 4, the casing horn 32 may be able to pivot to an angle "$\alpha$" away from the axially extending centerline 30c. The angle $\alpha$ may be between about 15-75 degrees, and in particular embodiments between about 30-60 degrees. The intermediate pipe segment 34 can be mounted in the apparatus 10 and releaseably secured with clamps or other securing means. The intermediate pipe segment 34 may also be mounted in the apparatus 10 prior to mounting the casing horn 32 and/or rotor assembly 35. In any event, the upstream piping that connects the intermediate pipe segment 34 to the product/filler pump and/or supply source can be connected.

The pivot head 33 can be configured with surfaces that register in an operative self-sealing configuration where an O-ring, gasket or other sealing means, is seated (such as between the coupler 44 outer surface and the socket 45 inner surface) when the pivot head 33 and casing horn 32 are moved to reside along the axial centerline and are substantially axially aligned. In certain embodiments, an O-ring (not shown) can reside in a groove 44g in a rearward portion of the coupler 44 as shown in FIGS. 7B, 7C and seal a flow channel extending through the socket 45 and coupler 44 to the casing horn 32.

FIGS. 4 and 5A illustrate a lateral pivot axis 33a for the casing horn 32 that allows the casing horn 32 to be moved side-to-side (rotated outwardly to load the desired casing material and inwardly to run). The casing horn 32 may, in certain embodiments, also pivot outwardly (or inwardly) out of axial alignment during installation/removal during changeover to the other horn type. In certain embodiments, the pivot movement may be restricted when mounted so as to substantially freely pivot toward an accessible first side but substantially impeded in pivoting with a corresponding angular motion toward the opposing side by the mounting hardware/apparatus. FIG. 5B illustrates an example of a proximity switch 139 that cooperates with the protrusion 46 on the pivot head 33 and/or horn rotor assembly 35.

Figure 6A:
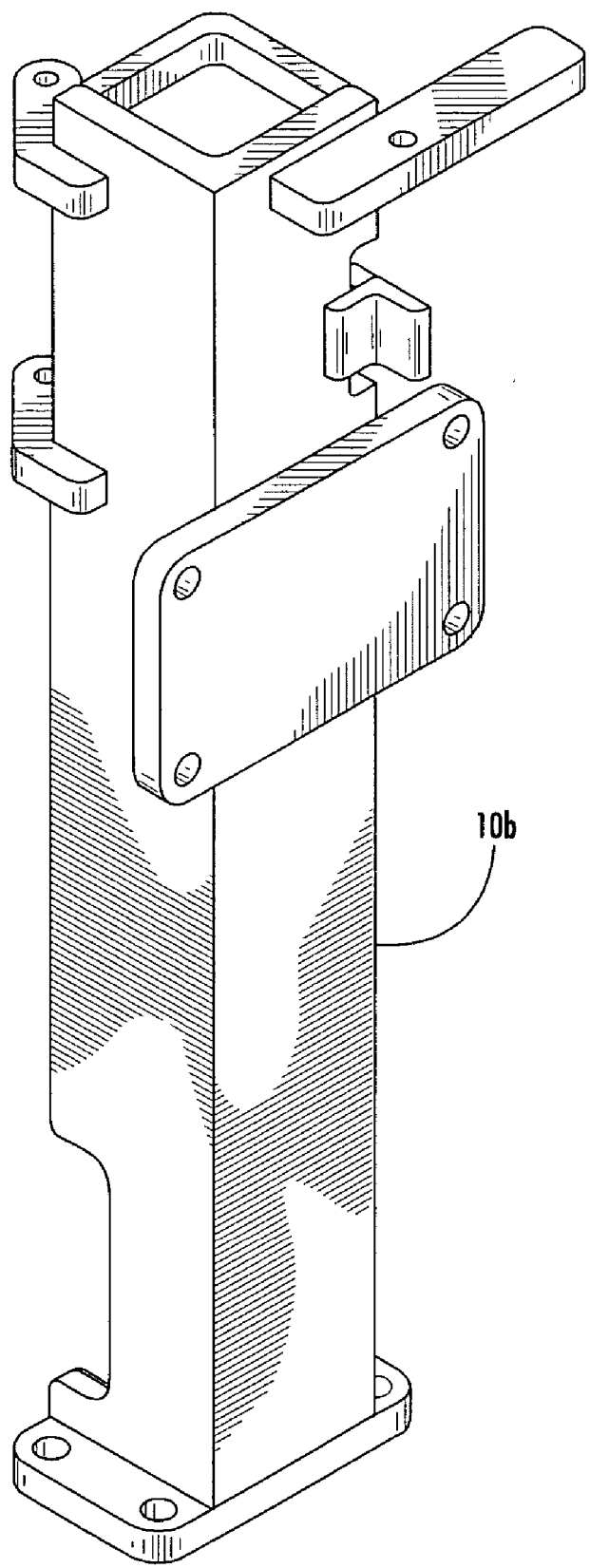
FIG. 6A is a side perspective view of the bracket shown in FIG. 5A according to embodiments of the present invention.
Figure 6B:
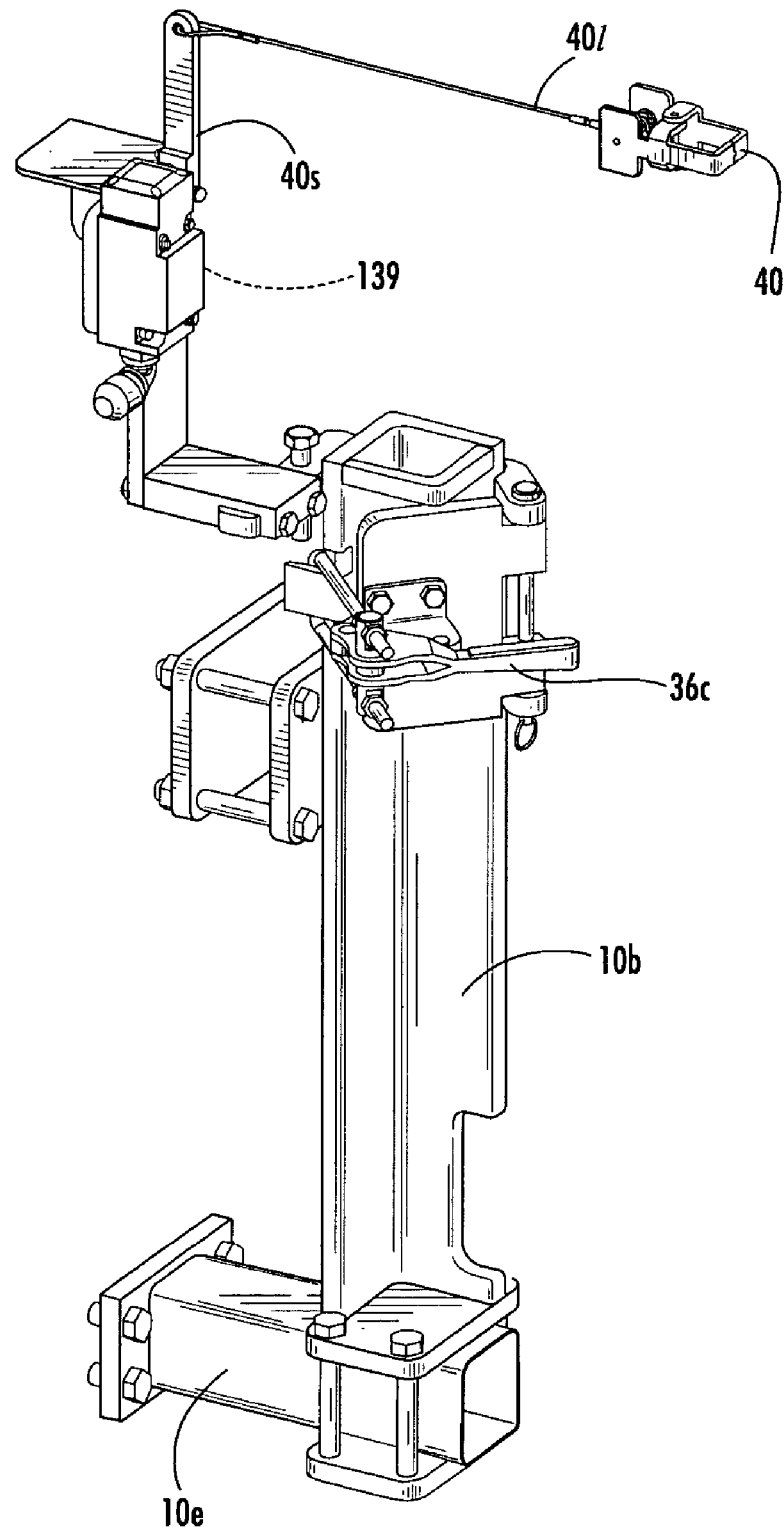
FIG. 6B is a side perspective view of the bracket shown in FIG. 5A mounted to the structures attached to the sealing apparatus shown in FIGS. 1A and 2A according to embodiments of the present invention.

FIG. 6A illustrates one configuration of a bracket 10b that is sized and configured to receive the horn rotor assembly support member 36. FIG. 6B illustrates that the bracket 10b can be configured to hold the limit switch 40s and the proximity switch 139 as well as the claiming structure 36c. The bracket 10b may be configured to receive an arm extension 10e attachable to the apparatus 10 so that it is positioned downstream thereof a desired distance.

Figure 7A:
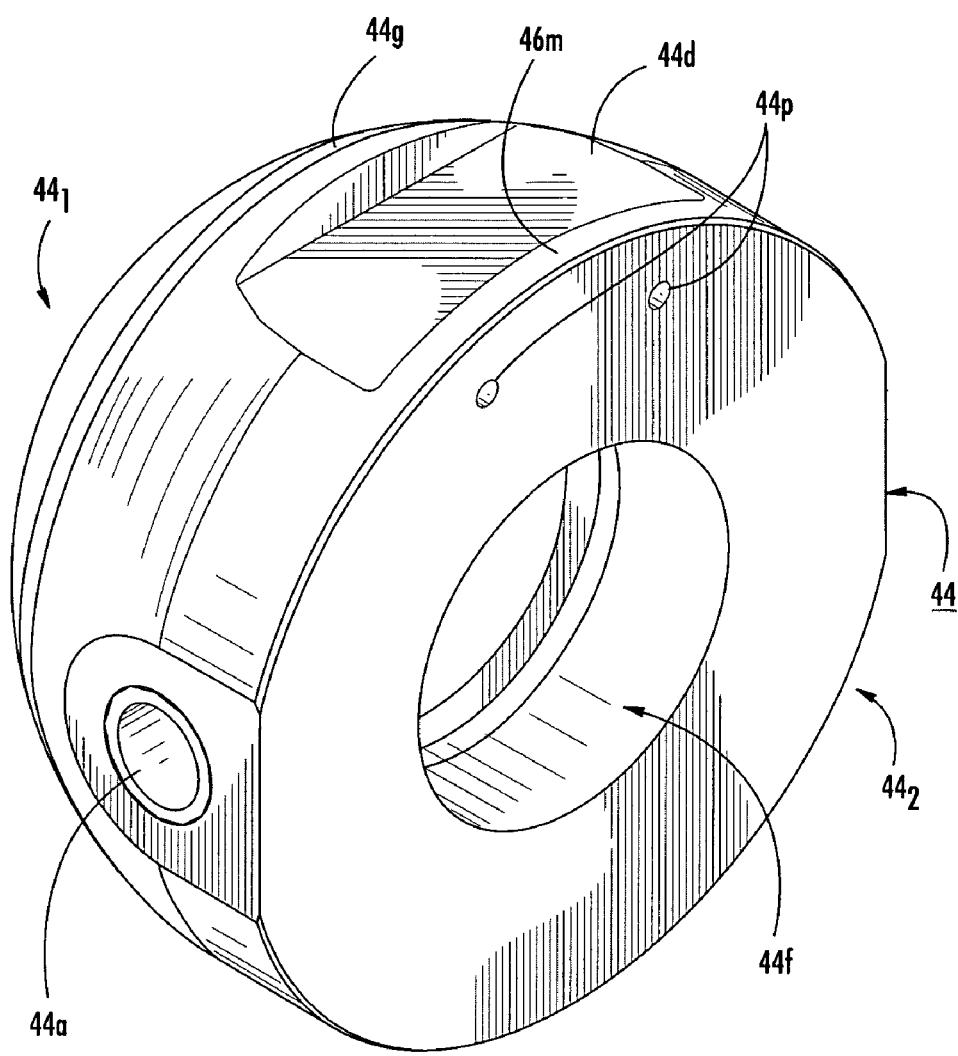
FIG. 7A is a side perspective view of a coupler and/or bushing that pivotably connect the device of FIG. 4 to the apparatus shown in FIG. 2C according to embodiments of the present invention.
Figure 7B:
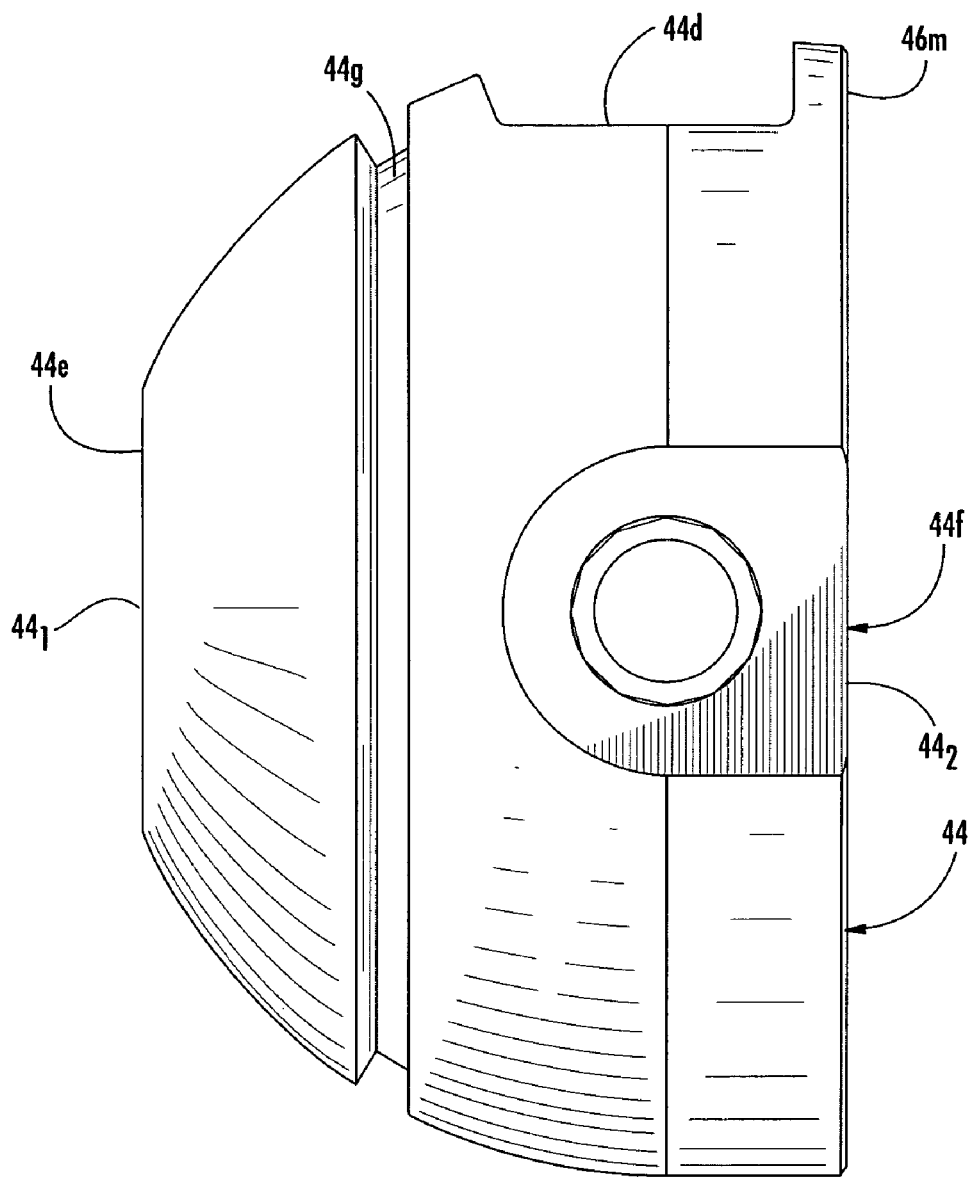
FIG. 7B is a side view of the coupler shown in FIG. 7A.

FIGS. 7A and 7B illustrate one embodiment of a coupler 44. As shown, the coupler 44 has opposing rearward and forward portions, 44$_1$, 44$_2$, respectively, with a flow channel 44f extending therebetween. The coupler 44 also includes a groove 44g on the rearward portion 44$_1$. The coupler 44 also includes apertures 44a sized and configured to receive bolts 33b or other mounting hardware (screws or other attachment means) to secure the coupler 44 to the socket 45. The apertures 44a may not be through apertures, i.e., have a length that is less than the thickness of the material thereat, so as to maintain a sealed cavity region thereunder.

As shown, in certain embodiments the coupler 44 may have a substantially semi-spherical profile with a planar rearward edge 44e and substantially open cavity and that provides the flow channel 44f. The coupler 44 may also include a depression region 44d on a portion of the outer surface and a lip 46m with two proximate mounting apertures 44p that can abut and hold the protrusion member/plate 46 (FIGS. 2B, 4). The forward edge portion 442 can include internal ACME threads that engage threads on the casing horn 32 to seal the connection therebetween (see, e.g., FIG. 4).

FIG. 7C illustrates another embodiment of the coupler 44. In this embodiment, the coupler 44 includes a forward extension 144 that is configured and sized to receive an adapter 43 (FIGS. 5A, 7D). The forward extension 144 can include threads that engage with mating threads on the rearward edge of the adapter 46 (FIG. 5A). The adapter 43 may have threads 43t on the inner surface (I.D.) thereof while the forward extension 144 can include corresponding mating threads 44t on its outer surface (O.D.). The thread patterns are not shown in FIG. 7C, 7D. The adapter 43 may include flat regions 43f to allow a tightening tool (i.e., wrench) easier contact and engagement to tighten the connection for proper sealing.

FIG. 7D illustrates an exemplary embodiment of the adapter 43 which includes opposing rearward and forward portions 43$_1$, 43$_2$, respectively and a flow channel 43f extending therebetween. As shown, the adapter 43 has a first diameter on the forward portion 43$_2$ and a larger diameter on the rearward portion 43$_1$.

In certain embodiments, the casing horn 32 can be supplied in incremental sizes, typically between about 1-3 inch (O.D.) configurations and/or a larger size configuration, typically about a 4-inch configuration. Each size generally corresponds to a desired product size and/or casing type. One horn rotor assembly 35 and/or pivot head 33 can be configured to accommodate several different sizes of casing horns 32 such as each of the 1-3 inch configurations, while a separate 4-inch horn assembly 35 may be provided. The adapter 43 can be attached to casing horns in the 1-3 inch range on one end and the 4 inch horn rotor assembly pivot head 33 on the other. Thus, the 1-3 inch adapter expands at the upstream end and can screw into the coupler 44. However, for a 3-inch pivot head 33, the casing horn 32 (or corresponding pipe attachment segment) can include female threads on an inner surface thereof that that screw directly onto threads formed on an internal surface of the coupler 44.

Figure 8A:
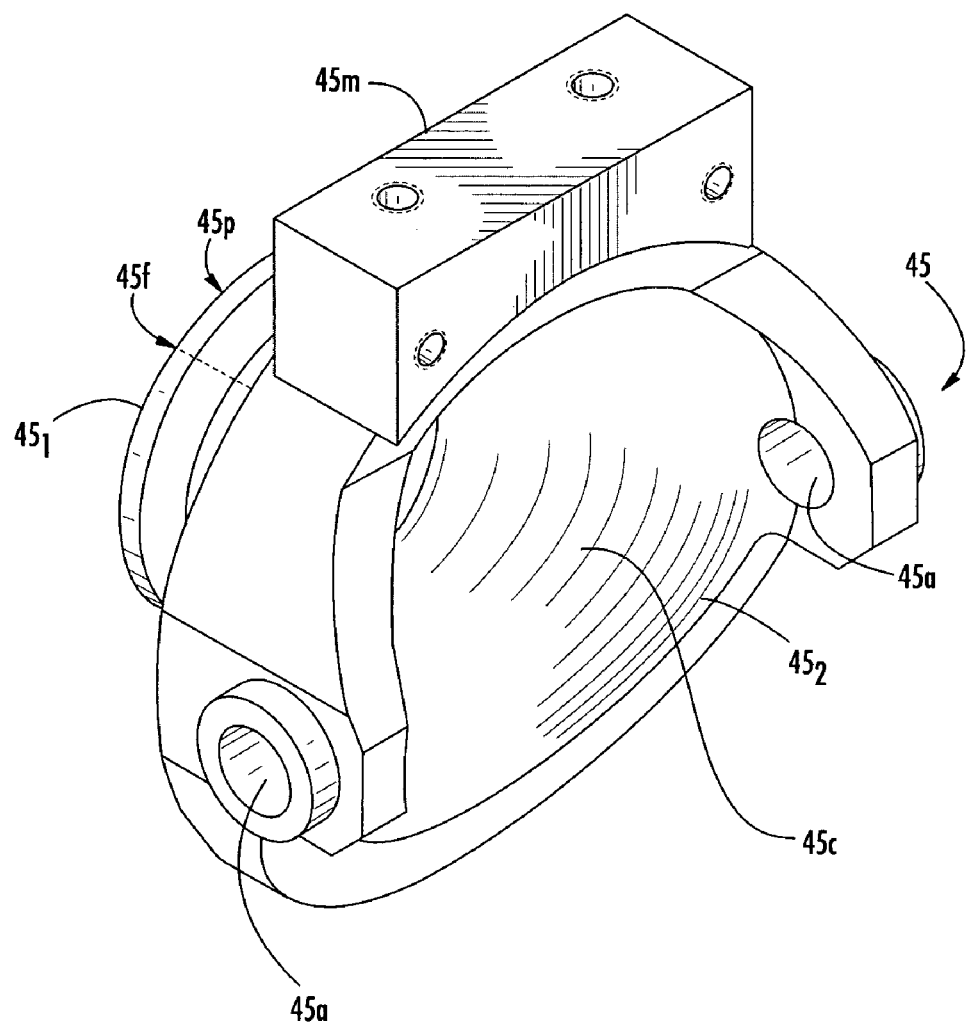
FIG. 8A is a side perspective view of a ball joint or socket that is sized and configured to hold the coupler of FIG. 7A according to embodiments of the present invention.
Figure 8B:
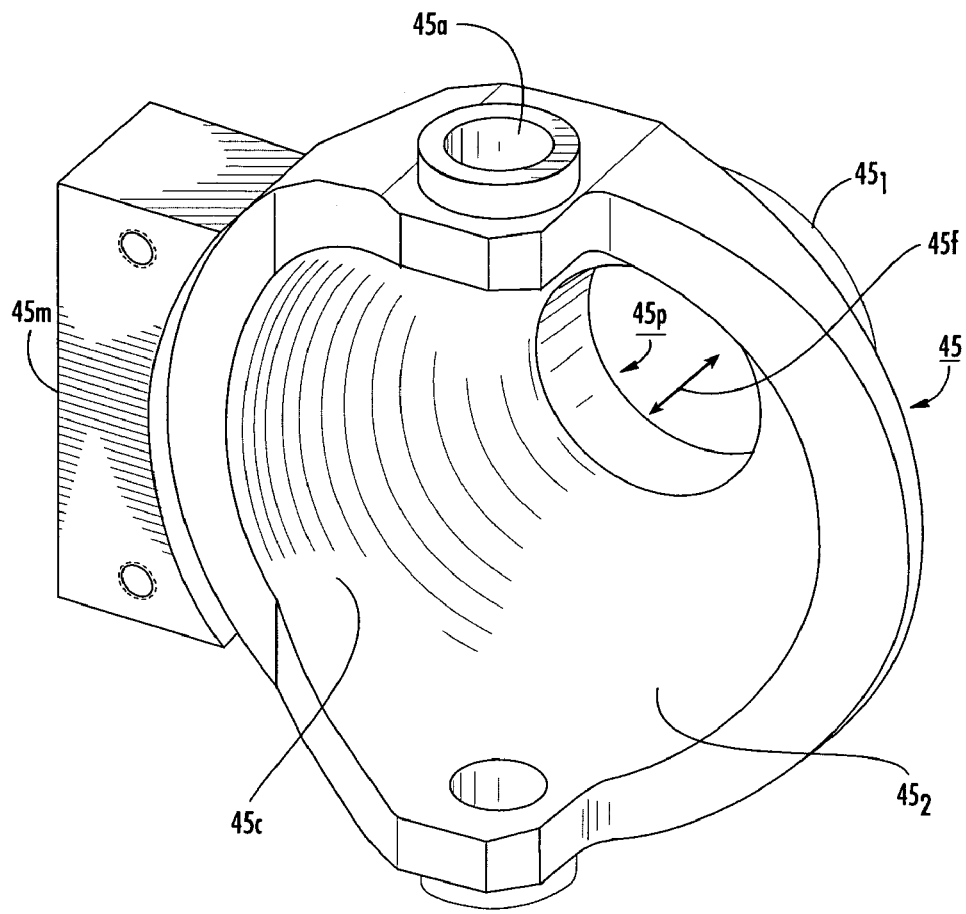
FIG. 8B is an enlarged front perspective view of the joint or socket shown in FIG. 8A.
Figure 10:
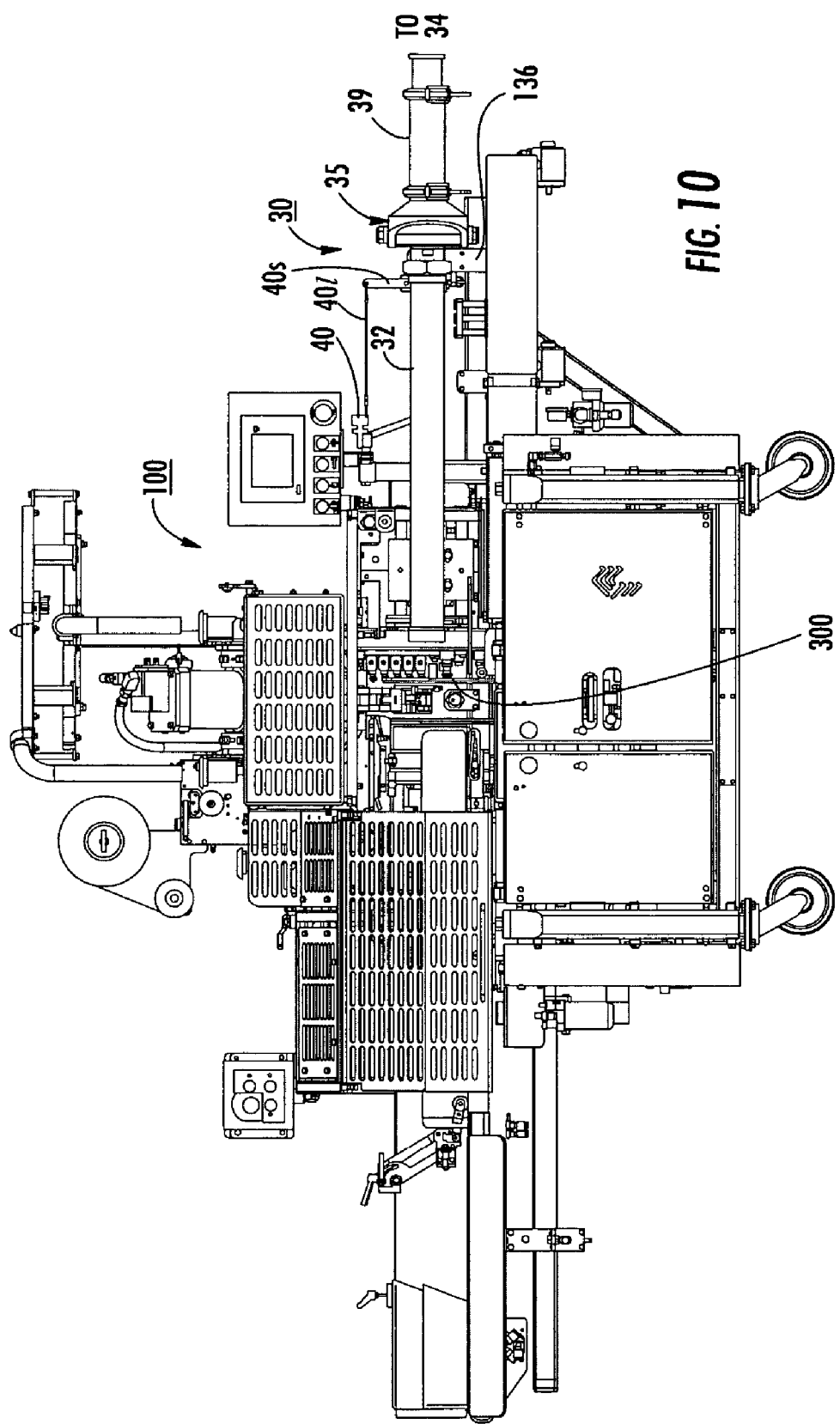
FIG. 10 is a front view of a shirred voiding/clipping apparatus with the horn rotor assembly in alignment therewith according to embodiments of the present invention.

FIG. 8A illustrates a socket 45 sized and configured to receive the rearward portion $44_1$ of the coupler 44. As such, the socket 45 includes an internal cavity 45c having a semi-spherical shape corresponding to the outer profile of the coupler 44. The socket 45 includes opposing rearward and forward portions $45_1$, $45_2$, respectively and a flow entry port 44p with a relatively short flow channel 45f that terminates into the coupler flow channel 44f during operation. The flow entry port 44p is in fluid communication with the intermediate pipe segment 34 (FIG. 2A) and pipe extension 39 (FIG. 10). The socket 45 includes apertures 45a for receiving bolts or other mounting structures therethrough, to secure the coupler 44 when the bolts 33b (see, e.g., FIG. 5B) are in place. The socket 45 can include a mounting bracket 45m that can releaseably attach to desired mounting structures. FIG. 8B illustrates a typical operative orientation of the socket 45 mounted to define a generally horizontal pivot axis.

Figure 9:
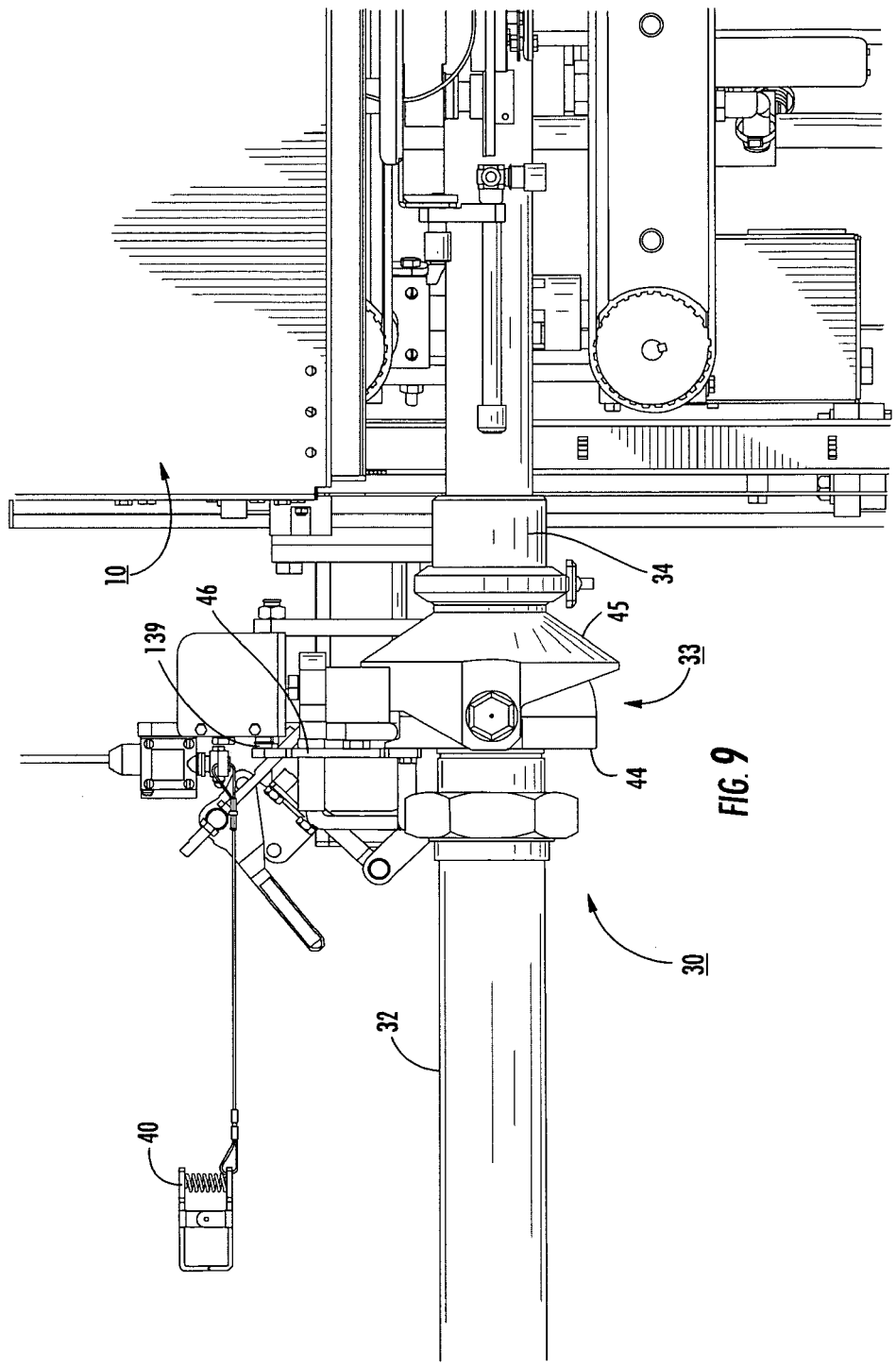
FIG. 9 is an enlarged top view of the pivot head and horn rotor assembly shown in FIG. 2A according to embodiments of the present invention.

FIG. 9 is a top view of the second horn assembly 30 in an operative position proximate the apparatus 10 with the proximity protrusion 46 in position proximate the proximity sensor 139. In certain embodiments, the apparatus 10 may include an automated horn detector (not shown) that is configured to automatically identify which horn 20, 32 and/or 34 is in use and to automatically select the corresponding run mode operational sequence based on that automatic detection. The detector may include a bar code (infrared) reader held in a location that can communicate with each of the first horn 20 and intermediate pipe segment 34 when in the apparatus 10 and the first horn 20 and intermediate pipe segment 34 have a bar code label fixed in a location corresponding to a reading location. Other detection means can also be used, including, for example, optical recognition sensors (noting the first horn is longer that the intermediate pipe segment), weight sensors, and the like. The detector may also be used to lock out operation if the incorrect horn is in position or if no horn is in position.

Figure 11:
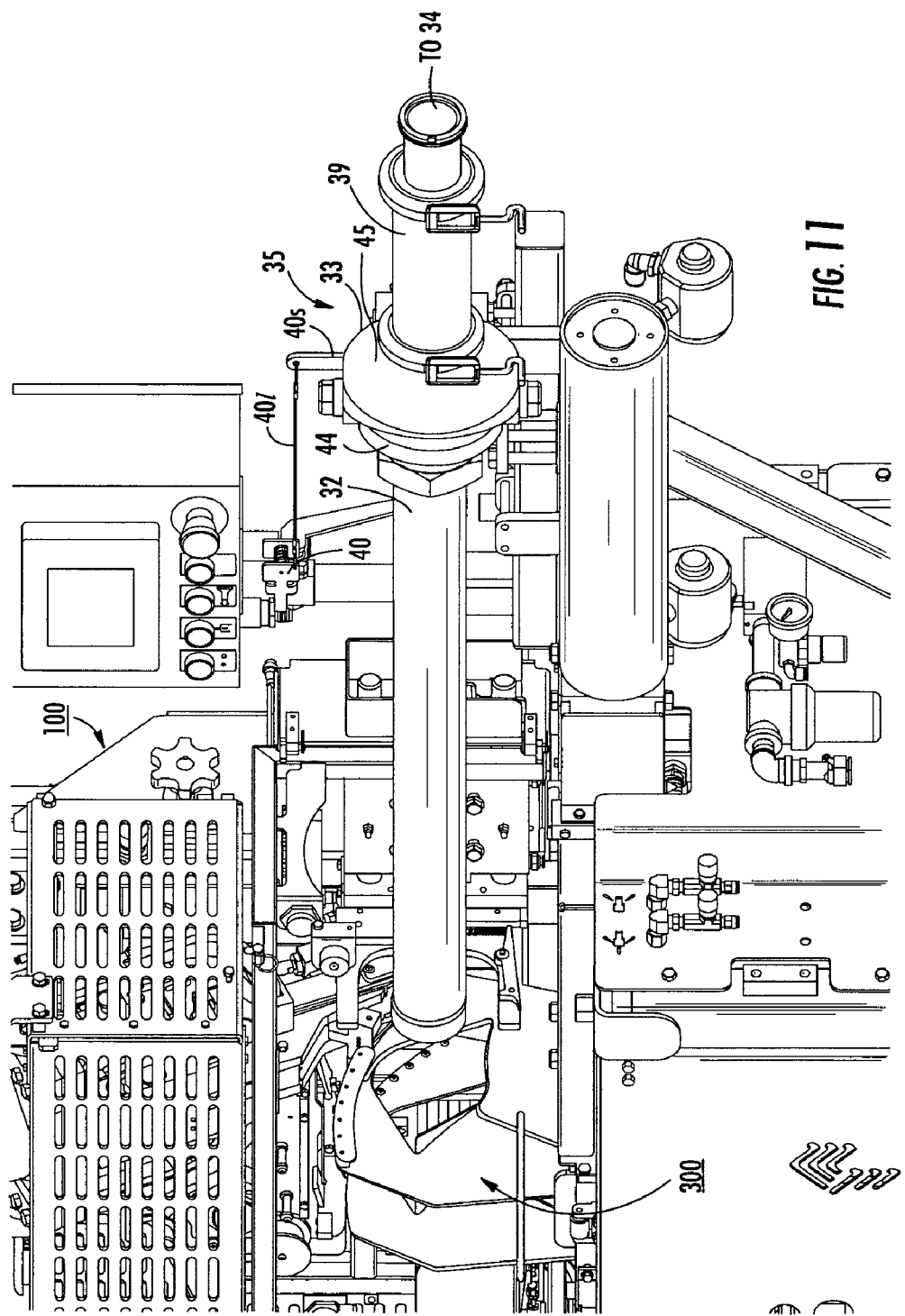
FIG. 11 is an enlarged partial side perspective view of the horn rotor assembly in position with the voiding plates shown in FIG. 10 according to embodiments of the present invention.

FIGS. 10 and 11 illustrate the second horn assembly 30 in position with respect to an adjacent downstream apparatus 100. In the embodiment shown, the apparatus 100 is a shirred voiding/clipping apparatus, such as the RS4203 model available from TIPPER TIE®, Tipper Tie, Inc., Apex, N.C. In operation, as is known to those of skill in the art, a skin brake sits on the downstream end portion of the horn which is positioned to be in communication with the apparatus 100 so as to cooperate with voiding plates 300 that allow clips to be attached to a voided casing region at desired intervals. The skin brakes (not shown) can be provided as internal or external skin brakes, recessed or flush mounted, and in sizes corresponding to the horn sizes (i.e., 1-3 inches in ½ inch increments and 4 inches). A sizing ring may be positioned under the casing on the forward edge portion of the horn outer surface to help provide a more uniform tensioning of the casing. The spacing and lengths of horns may be adjusted based on the type of skin break employed, the size of the horn (length and diameter), the type of product desired, and/or the casing type employed. Examples of exemplary devices and apparatus used to void, clip or tension casing material are described in U.S. Pat. Nos. 4,847,953; 4,675,945; 5,074,386; 5,167,567; and 6,401,885, the contents of which are hereby incorporated by reference as if recited in full herein. A sprayer can be positioned proximate the skin brake (on a downstream portion of whatever horn is in use) to dispense a suitable lubricant such as an oil including glycerin and/or mineral oil (not shown).

In operation, the encased product can be fed to the voiding/clipping apparatus 100 that can be configured to produce a series of single products or a series of chained encased products using either of the two types of casings. A clip can be applied to the beginning portion of a casing, food is pumped into the casing, and the filled casing is moved downstream from the filling point adjacent the discharge end of the horn. The filling can be interrupted momentarily while excess product is voided (pushed away from a clip zone on the package) and two clips can be applied concurrently to the casing at proximate but spaced apart lateral locations in the clip zone. A knife is used to separate the casing between the two concurrently applied clips to produce a sealed single package. This region between the two clips is sometimes described as the "tail" or end of the package. The first or forwardmost of the two clips forms the end of the forward (first) sealed product and the second or rearwardmost of the two clips forms the beginning of the next upstream package, which is now ready for filling which is restarted.

Sometimes, similar to the shirred single piece production method, two clips can be applied concurrently to a voided casing region, which action is repeated a number of times before cutting any of the links to generate a series or chain of linked "chubs." Thus, in operation, a desired number of chubs can be serially produced to form the desired length of product or number of chubs. This process can be described as a "chubbing operation." After the desired length of product and/or number of chubs is generated, the casing is voided and the two clips are concurrently applied to the casing as described above. The knife is then directed to cut the chain at the tail and start a new chain of linked product. The linked or chained products are typically vertically suspended together for further processing. See, e.g., U.S. Pat. Nos. 3,543,378, 5,167,567, 5,067,313, and 5,181,302, the contents of which are hereby incorporated by reference as if recited in full herein.

Generally stated, clips can be applied to the casing material to wrap around and close or seal the product therein. The seal formed by the clip against the casing may be sufficiently strong so as to be able to hold a vacuum of about 16 mm Hg for about 24-48 hours. Examples of suitable clips include metallic generally "U"-shaped clips available from Tipper Tie, Inc., in Apex, N.C. Other clips, clip materials and clip configurations may also be used.

Figure 12:
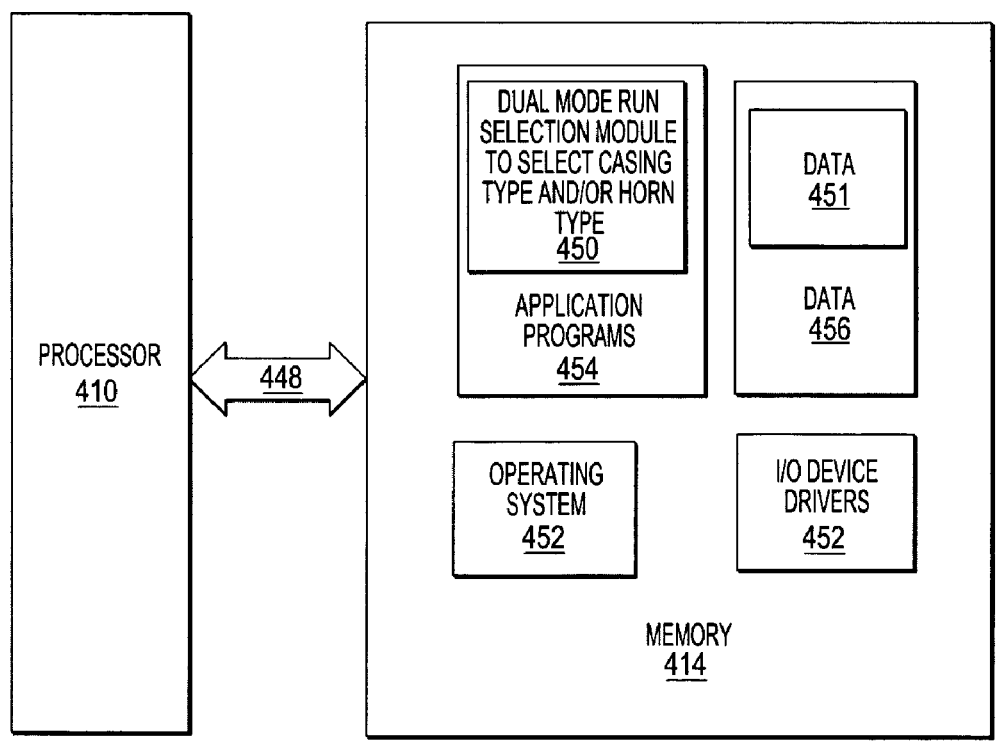
FIG. 12 is a block diagram of a data processing system according to embodiments of the present invention.

FIG. 12 is a block diagram of exemplary embodiments of data processing systems that illustrates systems, methods, and computer program products in accordance with embodiments of the present invention. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system 405. The memory 414 can include, but is not limited to, the following types of devices: cache, ROM, PROM, EPROM, EEPROM, flash memory, SRAM, and DRAM.

As shown in FIG. 12, the memory 414 may include several categories of software and data used in the data processing system 405: the operating system 452; the application programs 454; the input/output (I/O) device drivers 458; the Dual Mode Run Selection Module for selecting the operational sequence associated with the casing and/or horn type in use 450; and the data 456.

The data 456 may include a look-up chart of different casing run times (i.e., shirred slugs of casing for the second horn or tubular elastomeric (polymer) casings formed in situ, as well as the product, filling rates, selectable chain lengths and link lengths and the like 451 corresponding to particular or target products for one or more producers. The data 456 may include data from a proximity sensor and/or exhaustion of casing material detector that allows the computer program to automatically control the operation of the apparatus to inhibit discharging product when casing material has been expended.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components and/or the dispensing system 420. The application programs 454 are illustrative of the programs that implement the various features of the data processing system 405 and preferably include at least one application which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Dual Mode Run Selection Module 450 being an application program in FIG. 12, as will be appreciated by those of skill in the art, other configurations may also be utilized while still benefiting from the teachings of the present invention. For example, the Module 450 may also be incorporated into the operating system 452, the I/O device drivers 458 or other such logical division of the data processing system 405. Thus, the present invention should not be construed as limited to the configuration of FIG. 12, which is intended to encompass any configuration capable of carrying out the operations described herein.

The I/O data port can be used to transfer information between the data processing system 405 and the downstream voiding/clipping or closure attachment mechanism (such as for chubbed linked product) 420 or another computer system or a network (e.g., the Internet) or to other devices controlled by the processor. These components may be conventional components such as those used in many conventional data processing systems which may be configured in accordance with the present invention to operate as described herein.

For example, the data processing system can be a computer program product with computer readable program code configured to provide a plurality of different predetermined operational modes of an apparatus that releaseably mounts first and second horns with different horn configurations to supply different casings and a flowable product and computer readable program code configured to select one of the predetermined operational modes responsive to whether a first horn with a first casing material or a second casing horn with a second casing material different from the first casing material is in communication with the apparatus.

In particular embodiments, the computer readable program code is configured to accept user input to identify the type of casing material selected for deployment and/or a selection of the operational mode with either the first or second horn. In addition, the computer readable program code can be configured to inhibit operation until the desired horn is in proper operative position. In certain embodiments, the computer readable program code that inhibits operation comprises computer readable program code configured to obtain and analyze data from a proximity sensor positioned to automatically detect when the second horn is in operative horizontal position.

In addition, the computer readable program code can be configured to automatically identify when a casing supply on the second horn is exhausted. For example, the computer readable program code can be configured to monitor and/or detect when a limit switch is triggered responsive to force applied to a lead attached to a trailing edge portion of the supply of casing material as the trailing edge portion of the casing material advances. In addition, the computer program can include computer readable program code configured to obtain and analyze data from a proximity sensor positioned to automatically detect when the second horn is in operative horizontal position.

In particular embodiments, the computer program can include computer readable program code configured to disregard: (a) the computer readable program code configured to identify when a casing supply on the second horn is exhausted; and/or (b) the computer readable program code configured to obtain and analyze data from a proximity sensor positioned to automatically detect when the second horn is in operative horizontal position, when the second horn is running with the first horn.

In certain embodiments, the computer program can include computer readable program code configure to supply sheet roll stock to the first horn and form the roll stock into a tubular casing configuration in situ and/or computer readable program code that allows a manual stop and start to interrupt product flow to feed serially positioned slugs of fibrous casing material on the second horn. In addition, the computer program can include program code configured to control product flow from a pump positioned upstream of the apparatus to direct the product to flow through one of the first horn or second horn, responsive to which is installed in communication with the apparatus. In particular embodiments, the program can include program code that automatically identifies the desired operational mode by detecting which horn is in position on the apparatus.

Still further, the computer program may include computer program code that cooperates with a shirred casing voiding/clipping apparatus to deliver clips to encased product provided by the first or second horn, depending on which is operative.

While the present invention is illustrated, for example, with reference to particular divisions of programs, functions and memories, the present invention should not be construed as limited to such logical divisions. Thus, the present invention should not be construed as limited to the configuration of FIG. 12 but is intended to encompass any configuration capable of carrying out the operations described herein.

Figure 13:
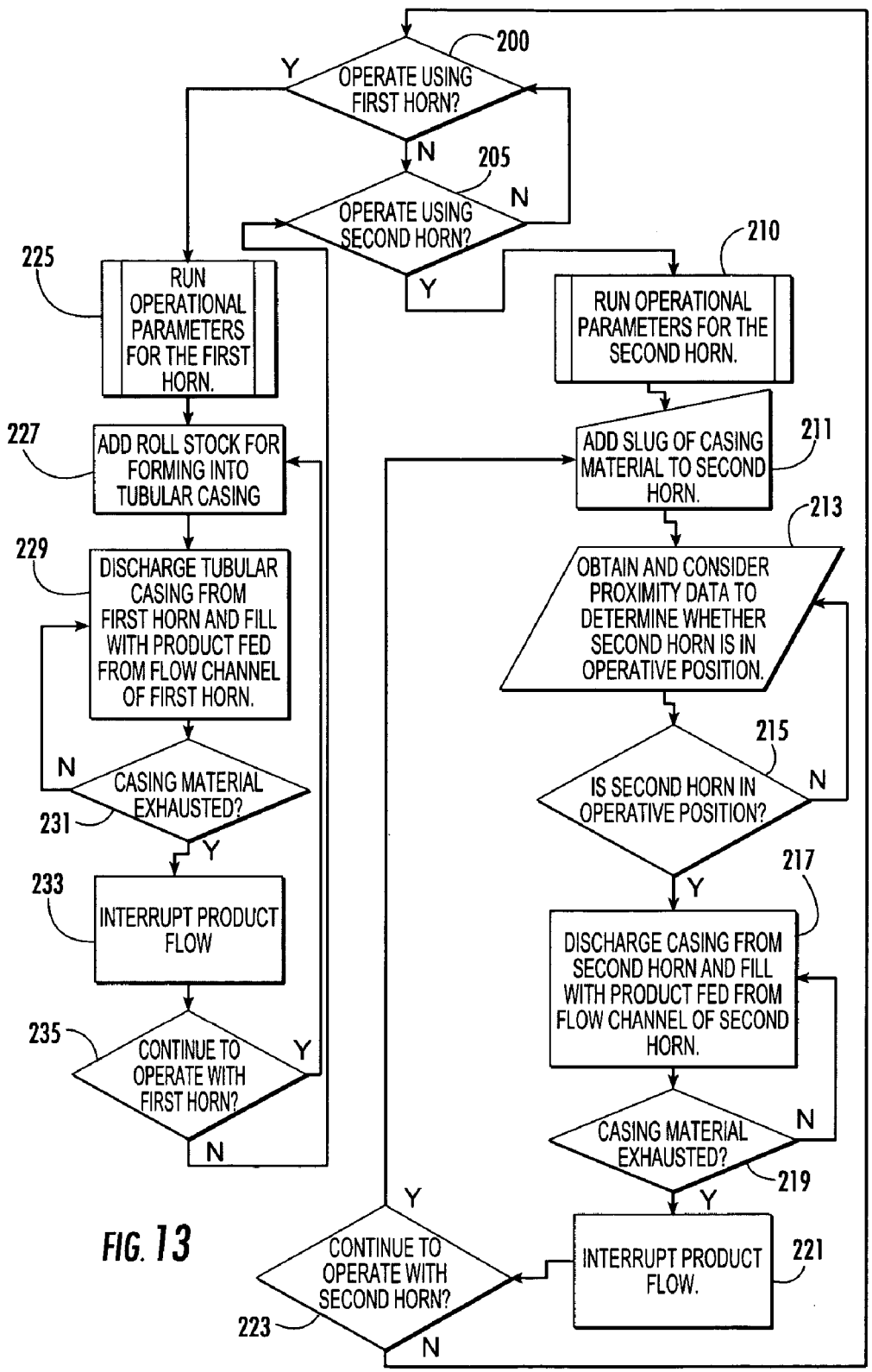
FIG. 13 is a flow chart of operations that may be carried out according to embodiments of the present invention.

The operation and sequence of events can be controlled by a programmable logic controller. The operational mode can be selected by an operator input using a Human Machine Interface to communicate with the controller as is well known to those of skill in the art. FIG. 13 is a flow chart of exemplary dual run sequence options for an apparatus configured to operate with interchangeable horn types. The series of operations (225, 227, 229, 231, 233 and 235) on the left are associated with the first horn configuration while those on the right (210, 211, 213, 215, 217, 219, 221 and 223) are associated with the second horn configuration.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus with interchangeable horns for engaging a filler/product pump and supplying elongate casings for encasing products therein, comprising:
    a housing having a support structure and opposing upstream and downstream end portions;
    a first horn releaseably mountable to the housing support structure, the first horn having a length, an outer surface and an internal flow channel therein, wherein, in operation, the first horn is configured to direct casing material to travel over the outer surface while product travels through the internal flow channel; and
    a horn rotor assembly releasably mountable to the housing support structure, the horn rotor assembly comprising a pivotable second horn with an outer surface and an intermediate pipe segment, each having a respective internal flow channel therein, wherein the second horn has an operative position whereby the second horn is in axial alignment with the intermediate pipe segment and a loading position whereby the second horn pivots laterally away from the operative position and the intermediate pipe segment, and wherein, in operation, product travels through the intermediate flow channel into the pivotable second horn while the second horn is adapted to allow a supply of casing material to travel over the outer surface thereof.

2. An apparatus according to claim 1, wherein the intermediate pipe segment and the first horn are configured to serially mount to the housing support structure so that, in position, each is aligned therein to have substantially the same axially extending centerline.

3. An apparatus according to claim 1, wherein, in operation, the apparatus further comprises a length of seamed tubular elastomeric film held over the outer surface of the first horn and/or a slug of stretchable fibrous casing held over the outer surface of the casing horn.

4. An apparatus according to claim 1, in combination with a shirred voiding/clipping apparatus, wherein the first horn and the horn rotor assembly are serially mountable to the housing to selectively output a desired casing to a downstream shirred voiding/clipping apparatus that engages an installed first horn or casing horn.

5. An apparatus according to claim 1, wherein the first horn and the horn rotor assembly are serially mountable to the housing one in place of the other so that either the first horn or intermediate pipe is in fluid communication with a filler/product pump disposed upstream of the housing.

6. A system according to claim 1, wherein only one of the first horn and horn rotor assembly is mounted to the housing support structure at a time.

7. A system according to claim 1, further comprising a pump in communication with either the first horn or the intermediate pipe, depending on whether the first horn or horn rotor assembly is mounted to the housing support structure, and wherein the pump is inoperative during the mounting interchange of the first horn with the horn rotor assembly.

8. An apparatus with interchangeable horns for engaging a filler/product pump and supplying elongate casings for encasing products therein, comprising:
    a housing having a support structure and opposing upstream and downstream end portions;
    a first horn releaseably mountable to the housing support structure, the first horn having a length, an outer surface and an internal flow channel therein, wherein, in operation, the first horn is configured to direct casing material to travel over the outer surface while product travels through the internal flow channel; and
    a horn rotor assembly releasably mountable to the housing support structure, the horn rotor assembly comprising a pivotable second horn with an outer surface and an intermediate pipe segment, each having a respective internal flow channel therein, wherein, in operation, product travels through the intermediate flow channel into the pivotable second horn while the second horn is adapted to allow a supply of casing material to travel over the outer surface thereof, and wherein the first horn is a heat seal horn configured to cooperate with sheet roll stock to form seamed elastomeric tubular casing in situ.

9. An apparatus according to claim 8, further comprising means for forming and sealing planar elastomeric sheet roll stock operably associated with the housing.

10. A system according to claim 8, wherein the first horn is statically mounted to the housing support structure and the second horn pivots transversely relative to an axial center line associated with the operative position for reloading the casing material.

11. A system according to claim 8, wherein the second horn pivots between about 15 to 75 degrees away from an axial center line associated with an operative position thereof to move to the loading position.

12. An apparatus with interchangeable horns for engaging a filler/product pump and supplying elongate casings for encasing products therein, comprising:

a housing having a support structure and opposing upstream and downstream end portions;

a first horn releaseably mountable to the housing support structure, the first horn having a length, an outer surface and an internal flow channel therein, wherein, in operation, the first horn is configured to direct casing material to travel over the outer surface while product travels through the internal flow channel; and a horn rotor assembly releasably mountable to the housing support structure, the horn rotor assembly comprising a pivotable second horn with an outer surface and an intermediate pipe segment, each having a respective internal flow channel therein, wherein, in operation, product travels through the intermediate flow channel into the pivotable second horn while the second horn is adapted to allow a supply of casing material to travel over the outer surface thereof, and wherein the first horn axially extends beyond a footprint defined by the housing and the intermediate pipe segment resides substantially within the footprint defined by the housing.

13. An apparatus with interchangeable horns for engaging a filler/product pump and supplying elongate casings for encasing products therein, comprising:

a housing having a support structure and opposing upstream and downstream end portions;

a first horn releaseably mountable to the housing support structure, the first horn having a length, an outer surface and an internal flow channel therein, wherein, in operation, the first horn is configured to direct casing material to travel over the outer surface while product travels through the internal flow channel; and a horn rotor assembly releasably mountable to the housing support structure, the horn rotor assembly comprising a pivotable second horn with an outer surface and an intermediate pipe segment, each having a respective internal flow channel therein, wherein, in operation, product travels through the intermediate flow channel into the pivotable second horn while the second horn is adapted to allow a supply of casing material to travel over the outer surface thereof, and wherein the horn rotor assembly has an overall assembled length that includes the assembled respective lengths of the casing horn, pivot head and intermediate pipe segment with the overall assembled horn rotor assembly length being substantially the same as the first horn length.

14. An apparatus according to claim 13, wherein the housing support structure comprises at least one mounting clamp that serially releasably attaches the intermediate pipe segment and/or the first horn, the apparatus further comprising a proximity switch configured to cooperate with the pivot head to detect when the casing horn is in an operational position.

15. A system according to claim 13, wherein, when the respective first or second horn is mounted to the housing support structure in an operative position, the respective horns extend along a substantially common axially extending centerline associated with the flow path.

16. An apparatus with interchangeable horns for engaging a filler/product pump and supplying elongate casings for encasing products therein, comprising:

a housing having a support structure and opposing upstream and downstream end portions;

a first horn releaseably mountable to the housing support structure, the first horn having a length, an outer surface and an internal flow channel therein, wherein, in operation, the first horn is configured to direct casing material to travel over the outer surface while product travels through the internal flow channel; and a horn rotor assembly releasably mountable to the housing support structure, the horn rotor assembly comprising a pivotable second horn with an outer surface and an intermediate pipe segment, each having a respective internal flow channel therein, wherein, in operation, product travels through the intermediate flow channel into the pivotable second horn while the second horn is adapted to allow a supply of casing material to travel over the outer surface thereof, and wherein the housing support structure comprises a support bracket disposed on the downstream end portion of the housing, and wherein the horn rotor assembly comprises a support member configured and sized to releasably attach to the support bracket.

17. An apparatus with interchangeable horns for engaging a filler/product pump and supplying elongate casings for encasing products therein, comprising:

a housing having a support structure and opposing upstream and downstream end portions;

a first horn releaseably mountable to the housing support structure, the first horn having a length, an outer surface and an internal flow channel therein, wherein, in operation, the first horn is configured to direct casing material to travel over the outer surface while product travels through the internal flow channel; and a horn rotor assembly releasably mountable to the housing support structure, the horn rotor assembly comprising a pivotable second horn with an outer surface and an intermediate pipe segment, each having a respective internal flow channel therein, wherein, in operation, product travels through the intermediate flow channel into the pivotable second horn while the second horn is adapted to allow a supply of casing material to travel over the outer surface thereof, and wherein the horn rotor assembly pivotable casing horn comprises a pivot head with a coupling member having a semi-spherical profile and a flow passage held in a socket member having a flow passage, the socket member configured to snugly receive the coupling member while allowing the coupling member to pivot relative thereto, and wherein, in a casing material load position, the pivot head is configured to allow the casing horn to angle substantially laterally outward out of axial alignment and, in operative position, the pivot head is configured to allow the casing horn to extend in a substantially horizontal axial aligned position.

18. An apparatus according to claim 17, wherein the coupling member comprises a groove disposed about an outer surface thereof and an O-ring held in the groove, wherein in operative position, the coupling member and socket flow passages are substantially aligned and the coupling member and socket are sealed to direct product through the flow passages into the casing horn flow channel to thereby inhibit product from otherwise discharging from the pivot head.

19. A system for producing encased products using selectable first and second horns to thereby produce products in selectable different casing types, comprising:

an apparatus having a releaseably mountable first horn that, in operation, is configured to be in fluid communication with a filler pump located upstream thereof, the first horn configured and sized to flow product therethrough and to cooperate with the apparatus to form, seal and/or guide seamed casing material thereabout; and a releaseably mountable second horn assembly comprising an intermediate pipe segment in fluid communication with a second horn, wherein, in operation, the second horn assembly is configured to replace the first horn and be in fluid communication with the filler pump for flowing product therethrough after the first horn is dismounted from the apparatus, wherein the second horn has an operative position whereby the second horn is in axial alignment with the intermediate pipe segment and a casing loading position whereby the second horn pivots laterally away from the operative position and the intermediate pipe segment.

20. A system according to claim 19, wherein the second horn is configured to hold non-seamed casing material thereon and wherein, when in position on the apparatus, the first horn and the intermediate pipe segment have substantially the same axially extending centerline location and both the first horn and intermediate pipe segment are serially statically mounted to the apparatus.

21. A system according to claim 20, wherein the second horn assembly comprises a horn rotor with a pivot head having a coupling member and socket configured to allow the second horn to pivot relative thereto, and wherein the second horn has a load configuration with the second horn oriented angularly outward from upstream piping and an operative configuration with the second horn oriented substantially horizontally axially aligned with upstream piping.

22. A system according to claim 21, wherein the horn rotor comprises a support leg attached thereto, wherein the apparatus comprises a leg support bracket fixed thereto, and wherein the support leg mounts to the leg support bracket when the second horn assembly is attached to the apparatus.

23. A system according to claim 19, wherein the second horn has a pivotable end portion that allows the second horn to laterally pivot outward from an axially extending centerline of the operative position of the second horn.

24. A system according to claim 19, wherein the second horn pivots between about 15 to 75 degrees away from an axial center line associated with an operative position thereof to move to the loading position.

* * * * *